US009576061B2

(12) United States Patent
Yamamoto et al.

(10) Patent No.: US 9,576,061 B2
(45) Date of Patent: Feb. 21, 2017

(54) INFORMATION PROCESSING SYSTEM AND DATA UPDATE CONTROL METHOD

(71) Applicant: FUJITSU LIMITED, Kawasaki-shi, Kanagawa (JP)

(72) Inventors: Akinori Yamamoto, Odawara (JP); Kouji Takahashi, Yokohama (JP); Kohshi Yamamoto, Kawasaki (JP); Hisashi Sugawara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 361 days.

(21) Appl. No.: 14/299,104

(22) Filed: Jun. 9, 2014

(65) Prior Publication Data
US 2014/0372353 A1  Dec. 18, 2014

(30) Foreign Application Priority Data

Jun. 13, 2013  (JP) ................................ 2013-124318

(51) Int. Cl.
| G06F 15/18 | (2006.01) |
| G06E 1/00  | (2006.01) |
| G06E 3/00  | (2006.01) |
| G06G 7/00  | (2006.01) |
| G06F 17/30 | (2006.01) |

(52) U.S. Cl.
CPC .............................. G06F 17/30879 (2013.01)

(58) Field of Classification Search
USPC ........................................................ 706/21
See application file for complete search history.

(56) References Cited

U.S. PATENT DOCUMENTS 6,377,959 B1    4/2002  Carlson
8,250,284 B2 *  8/2012  Nakamichi ........... G06F 3/0605
                                                    710/15
8,928,664 B2 *  1/2015  Hasegawa ............. G06T 11/206
                                                   345/440

(Continued)

FOREIGN PATENT DOCUMENTS

JP    07-262068    10/1995
JP    07-302242    11/1995
JP    2002-251491   9/2002

OTHER PUBLICATIONS

MuR-DPA: Top-Down Levelled Multi-Replica Merkle Hash Tree Based Secure Public Auditing for Dynamic Big Data Storage on Cloud Chang Liu; Rajiv Ranjan; Chi Yang; Xuyun Zhang; Lizhe Wang; Jinjun Chen IEEE Transactions on Computers Year: 2015, vol. 64, Issue: 9 pp. 2609-2622, DOI: 10.1109/TC.2014.2375190 IEEE Journals & Magazines.*

(Continued)

Primary Examiner — Michael B Holmes
(74) Attorney, Agent, or Firm — Fujitsu Patent Center

(57) ABSTRACT

An arithmetic operation unit receives a request to update a first data group during restoration using first history information and generates second history information indicating a history of updates. The arithmetic operation unit predicts a time taken until completion of restoration using the second history information on the basis of an amount of the second history information. The arithmetic operation unit compares the predicted time with a threshold and limits at least part of updates of the first data group during the restoration using the second history information on the basis of the comparison result.

7 Claims, 16 Drawing Sheets

(56) References Cited

U.S. PATENT DOCUMENTS 9,165,020 B2 * 10/2015 Sugawara ......... G06F 17/30303
9,201,888 B2 * 12/2015 Suzuki ................ G06F 17/3007
9,496,895 B2 * 11/2016 Kataoka .............. H03M 7/3086

OTHER PUBLICATIONS 7.3 A 28nm embedded SG-MONOS flash macro for automotive achieving 200MHz read operation and 2.0MB/S write throughput at Ti, of 170 C Yasuhiko Taito; Masaya Nakano; Hiromi Okimoto; Daisuke Okada; Takashi Ito; Takashi Kono; Kenji Noguchi; Hideto Hidaka; Tadaaki Yamauchi 2015 IEEE Intl Solid-State Circuits Conf—pp. 1-3 IEEE Conference Publications.*

Sparse multinomial logistic regression: fast algorithms and generalization bounds B. Krishnapuram; L. Carin; M. A. T. Figueiredo; A. J. Hartemink IEEE Transactions on Pattern Analysis and Machine Intelligence Year: 2005, vol. 27, Issue: 6 pp. 957-968, DOI: 10.1109/TPAMI.2005.127 IEEE Journals & Magazines.*

Web-Based Content Management System for Equipment Information Ryan Taylor 2012 19th Biennial University/Government/Industry, Micro/Nano Symposium (UGIM) Year: 2012 pp. 1-1, DOI: 10.1109/UGIM.2012.6247085 IEEE Conference Publications.*

* cited by examiner

| SQL PRIORITY TABLE | 131 |
| --- | --- |
| SQL PRIORITY | APPLICATION CLASSIFICATION |
| 1 | BATCH PROCESSING |
| 2 | GENERAL PROCESSING |
| 3 | ONLINE PROCESSING |
| ... | ... |

FIG. 5

| NO-UPDATE PROBABILITY TABLE ||||||||
|---|---|---|---|---|---|---|---|
| PRIORITY THRESHOLD | NO-UPDATE PROBABILITY |||||||
| | 1 | 2 MIN | 3 MIN | 4 MIN | 5 MIN | 6 MIN | ... |
| 1 | 80% | 67% | 55% | 50% | 47% | 45% | ... |
| 2 | 83% | 70% | 60% | 54% | 50% | 47% | ... |
| 3 | 93% | 88% | 83% | 75% | 63% | 55% | ... |
| ... | ... | ... | ... | ... | ... | ... | ... |

| ACCESS STATISTICS TABLE (SQL PRIORITY: 1 OR HIGHER) ||||
|---|---|---|---|
| TIME | NUMBER OF MEASURE-MENTS | NUMBER OF UPDATES | NO-UPDATE PROBABILITY |
| 1 MIN | 20 | 4 | 80% |
| 2 MIN | 30 | 10 | 67% |
| 3 MIN | 60 | 27 | 55% |
| ... | ... | ... | ... |

FIG. 7

INFORMATION PROCESSING SYSTEM AND DATA UPDATE CONTROL METHOD

CROSS-REFERENCE TO RELATED APPLICATION

This application is based upon and claims the benefit of priority of the prior Japanese Patent Application No. 2013-124318, filed on Jun. 13, 2013, the entire contents of which are incorporated herein by reference.

FIELD

The embodiments discussed herein relate to an information processing system and a data update control method.

BACKGROUND

At present, the information processing apparatus, such as a computer, is used in various kinds of data processing. In the system for managing data, there is a case where a copy of data stored in a storage device is also stored in another storage device. In this case, even if one of the storage devices fails, it is possible to continue processing using the data stored in the other storage device. For example, there is a system which makes a database redundant by storing the database having the same contents in a plurality of storage devices and by synchronizing each database.

In this system, if one of the storage devices fails, it is no longer possible to use the database stored in this storage device, and therefore, the system is operated by the single database. In this case, if the single database is no longer available because of a failure etc., it is no longer possible to continue data processing. Because of this, it is considered to restore the contents of the database during suspension of use to the contents at the same time point as that of the database in use and to resume the synchronized operation. The restoration method of a database includes methods as follows.

For example, the database is restored by acquiring a transaction log storing a history of updates of the database in use and by performing the transaction log again on the database to be restored after complete suspension of the use of the database in use. Further, for example, there is also proposed a restoration method not using the transaction log. In this proposal, when a first database system is referred to or updated, the record that is referred to or updated is duplicated in a second database system to be restored, and thus, the database of the second database system is restored (for example, see Japanese Laid-open Patent Publication No. 07-262068).

As described above, there is a case where a second data group stored in a second storage device is restored using history information indicating the history of updates of a first data group (e.g., database) stored in a first storage device. At this time, it is considered to restore the second data group while receiving updates of the first data group. However, in this case, there is a problem of a possibility that the time taken until completion of the restoration of the second data group is increased.

For example, if the first data group is updated during restoration of the second data group using the history information up to a first time point, history information corresponding to a difference between the data at the first time point and the data at a second time point (first difference) may be generated. Consequently, after restoration of the second data group up to the first time point, the second data group is restored up to the second time point using the first difference. Then, there may be generated history information corresponding to a difference between the data at the second time point and the data at a third time point (second difference) during the restoration. In other words, until there is no longer a difference in history information, a new difference is applied sequentially.

However, a large amount of updates may be generated during application of the first difference. These updates are stored in the second difference. If the second difference includes a large amount of updates, the application time of the second difference becomes long. Consequently, the amount of updates of the first data group may also increase within the application time of the second difference. Because of this, there is further a possibility that the application time of the next difference (third difference) also becomes long. If this is repeated and the application time of each difference becomes long, it takes time until completion of restoration of the second data group. If the operation using the single data group becomes long, the possibility is increased that it is no longer possible to continue processing at the time of occurrence of a failure etc.

SUMMARY

In one aspect of the embodiments, there is provided a non-transitory computer-readable storage medium storing therein an update control program that causes a computer to perform a process, the computer being in a system which includes a first storage device and a second storage device. The process includes: receiving a request to update a first data group stored in the first storage device during restoration of a second data group stored in the second storage device using first history information indicating a history of updates of the first data group; generating second history information indicating a history of updates based on the received request; predicting a time taken until completion of restoration using the second history information based on an amount of the second history information; and limiting, based on the predicted time, at least part of updates of the first data group during the restoration using the second history information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a SQL priority table;

FIG. 6 illustrates an example of a no-update probability table;

FIG. 7 illustrates an example of an access statistics table;

DESCRIPTION OF EMBODIMENTS

Figure 1A:
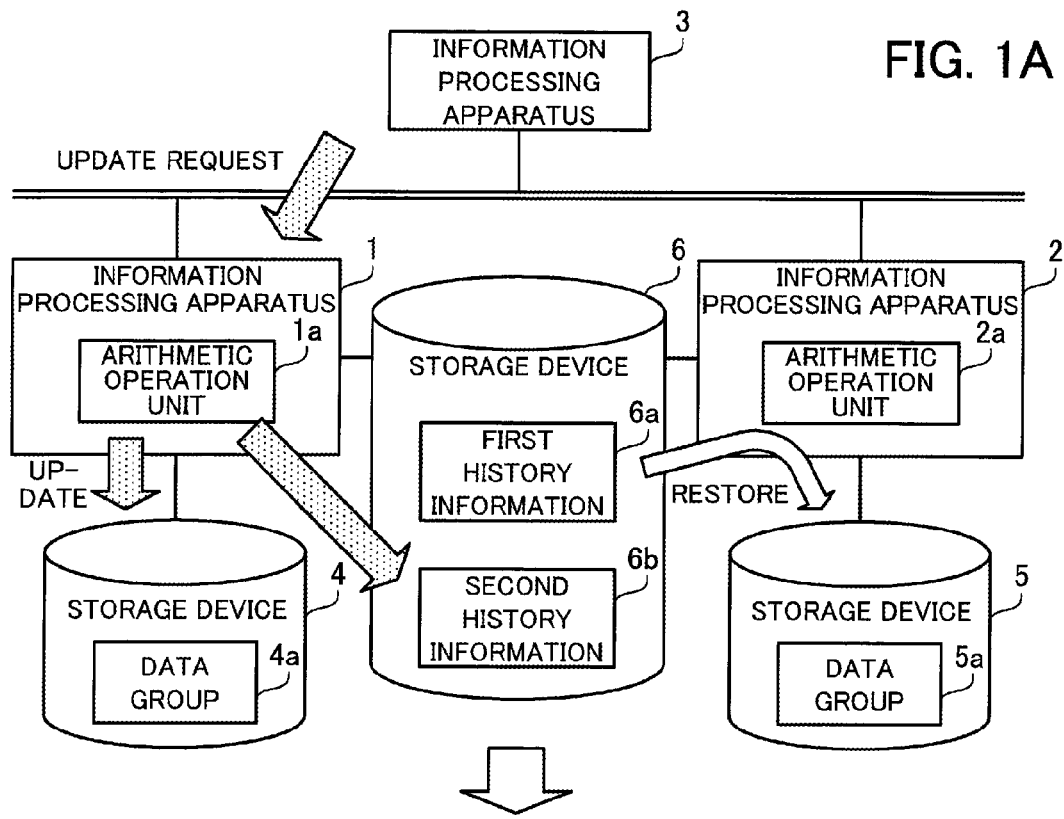
FIGS. 1A and 1B illustrate an information processing system of a first embodiment.

Several embodiments will be described below with reference to the accompanying drawings, wherein like reference numerals refer to like elements throughout.

First Embodiment

Figure 1B:
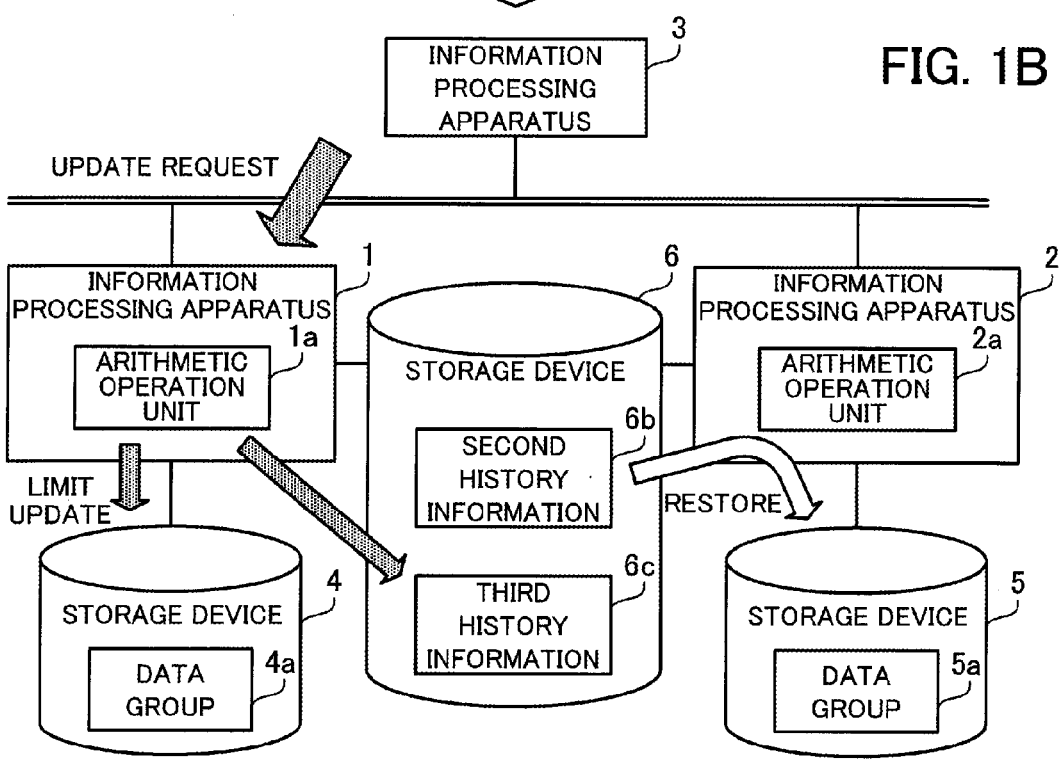

FIGS. 1A and 1B illustrate an information processing system of a first embodiment. The information processing system of the first embodiment includes information processing apparatuses 1, 2, and 3 and storage devices 4, 5, and 6. The information processing apparatuses 1, 2, and 3 are connected via a network. The information processing apparatus 1 is connected with the storage devices 4 and 6. The information processing apparatus 1 may incorporate the storage device 4. The information processing apparatus 1 may be connected with the storage devices 4 and 6 via a network. The information processing apparatus 2 is connected with the storage devices 5 and 6. The information processing apparatus 2 may incorporate the storage device 5. The information processing apparatus 2 may be connected with the storage devices 5 and 6 via a network. The storage devices 4, 5, and 6 may be nonvolatile storages devices, such as HDD (Hard Disk Drive) and flash memory.

The storage device 4 stores a data group 4a. The storage device 5 stores a data group 5a. The data groups 4a and 5a may be databases. In the information processing system of the first embodiment, failure resistance is improved by synchronizing the contents of the data groups 4a and 5a using the information processing apparatuses 1 and 2. In other words, in the normal operation, the system is operated with redundant data. The information processing apparatus 1 and the storage device 4 are used as the main system (currently used system). The information processing apparatus 2 and the storage device are used as the sub-system (standby system). The information processing apparatus 3 performs processing using the data group 4a. For example, the information processing apparatus 3 refers to, updates, etc., data included in the data group 4a. Updating the data group 4a includes adding data to the data group 4a, changing data included in the data group 4a, and deleting data included in the data group 4a. In the normal operation, updates of the data group 4a are reflected also in the data group 5a and thus both the data groups are synchronized.

The information processing apparatus 1 has an arithmetic operation unit 1a. The arithmetic operation unit 1a may include a CPU (Central Processing Unit), a DSP (Digital Signal Processor), an ASIC (Application Specific Integrated Circuit), an FPGA (Field Programmable Gate Array), etc. The arithmetic operation unit 1a may be a processor configured to execute a program. The processor may include a set of a plurality of processors (multiprocessor) (this also applies hereinafter). The information processing apparatus 1 has a memory, such as a RAM (Random Access Memory), configured to store data used in the processing of the arithmetic operation unit 1a (not illustrated).

The arithmetic operation unit 1a may update the data group 4a stored in the storage device 4. The arithmetic operation unit 1a updates the data group 4a, generates history information (log) indicating a history of updates, and stores the history information in the storage device 6. The history information may be update logs accumulated in the memory of the information processing apparatus 1 and output to a storage area of the storage device 6.

The information processing apparatus 2 has an arithmetic operation unit 2a. The arithmetic operation unit 2a may include a CPU, a DSP, an ASIC, an FPGA, etc. The arithmetic operation unit 2a may be a processor configured to execute a program. The information processing apparatus 2 has a memory, such as a RAM, configured to store data used in the processing of the arithmetic operation unit 2a (not illustrated). The arithmetic operation unit 2a restores the data group 5a within the storage device 5 using the history information stored in the storage device 6 when a failure occurs in the storage device 5.

FIG. 1A illustrates processing of the arithmetic operation unit 1a when the arithmetic operation unit 2a restores the data group 5a up to a first time point using first history information 6a. The arithmetic operation unit 1a continuously receives update requests from the information processing apparatus 3 and continues updates of the data group 4a. The arithmetic operation unit 1a generates second history information 6b accompanying the update and stores the second history information 6b in the storage device 6. After restoring the data group 5a up to the first time point using the first history information 6a, the arithmetic operation unit 2a restores the data group 5a up to a second time point after the first time point using the second history information 6b.

FIG. 1B illustrates processing of the arithmetic operation unit 1a when the arithmetic operation unit 2a restores the data group 5a up to the second time point using the second history information 6b. The arithmetic operation unit 1a predicts a time taken until completion of the restoration using the second history information 6b from the amount of the second history information 6b. For example, it is considered that the arithmetic operation unit 1a measures a rate to apply history information (amount of information that may be applied per unit time) from the record of the restoration processing using the first history information 6a. Due to this, it is possible to predict the time taken until completion of the restoration using the second history information 6b from the rate and the amount of the second history information 6b.

The arithmetic operation unit 1a compares the predicted time with a threshold and limits at least part of the updates of the data group 4a during the restoration using the second history information 6b based on the comparison result. For example, the arithmetic operation unit 1a limits the update in the case where the predicted time exceeds a threshold given in advance to the information processing apparatus 1. The threshold may be specified based on the time during which it is expected that the data group 4a is not updated with a predetermined probability.

The arithmetic operation unit 1a may determine the update of be limited according to the software executed in the information processing apparatus 3 or the kind of the software. For example, it may also be possible to limit the update by the software having a relatively low priority and not to limit the update by the software having a relatively high priority. In this case, even if an update request is received from the software for which the update is limited, the arithmetic operation unit 1a does not perform the update.

In this manner, during restoration of the data group 5a up to the second time point by the arithmetic operation unit 2a using the second history information 6b also, the arithmetic operation unit 1a receives update requests from the information processing apparatus 3. Then, the arithmetic operation unit 1a generates third history information 6c and stores the third history information 6c in the storage device 6. Upon completion of the restoration using the second history information 6b, the arithmetic operation unit 2a subsequently performs restoration using the third history information 6c.

According to the information processing system of the first embodiment, during restoration using the first history information 6a, the information processing apparatus 1 receives a request to update the data group 4a and the second history information 6b indicating the history of updates is generated. The information processing apparatus 1 predicts the time taken until completion of the restoration using the second history information 6b from the amount of the second history information 6b. The information processing apparatus 1 compares the predicted time with the threshold and at least part of the updates of the data group 4a during the restoration using the second history information 6b are limited based on the comparison result.

Due to this, it is possible to suppress the data restoration from being prolonged. For example, in the case where the amount of updates stored in the second history information 6b is large, there is a possibility that the restoration using the second history information 6b takes a long time. In this case, if all the updates during the restoration are received, the amount of updates of be stored in history information following the second history information 6b also increases, and therefore, there is a possibility that the restoration using the history information also takes a long time. As described above, during restoration using history information, another piece of history information in which a large amount of updates is stored may be generated. Then, if this is repeated, there is a possibility that data restoration takes a long time. In this case, it takes a long time to resume the synchronization of the data groups 4a and 5a and the operation using only the data group 4a may be prolonged.

Because of this, in the case where it is predicted that the restoration using the second history information 6b takes a comparatively long time, the information processing apparatus 1 limits at least part of the updates of the data group 4a during the restoration using the second history information 6b. Due to this, it is possible to reduce the amount of updates stored in the third history information 6c, and therefore, it is possible to reduce the time taken for the restoration using the third history information 6c compared to the case where all the updates are stored. Consequently, it is also possible to reduce the amount of updates stored during the restoration using the third history information 6c. Because of this, the time taken for the restoration using the next history information is suppressed from being increased and the amount of updates stored during the restoration is also suppressed from increasing. By doing so, it is possible to suppress the time taken to apply the history information generated sequentially to the data group 5a from being long and to suppress data restoration from being prolonged.

Second Embodiment

Figure 2:
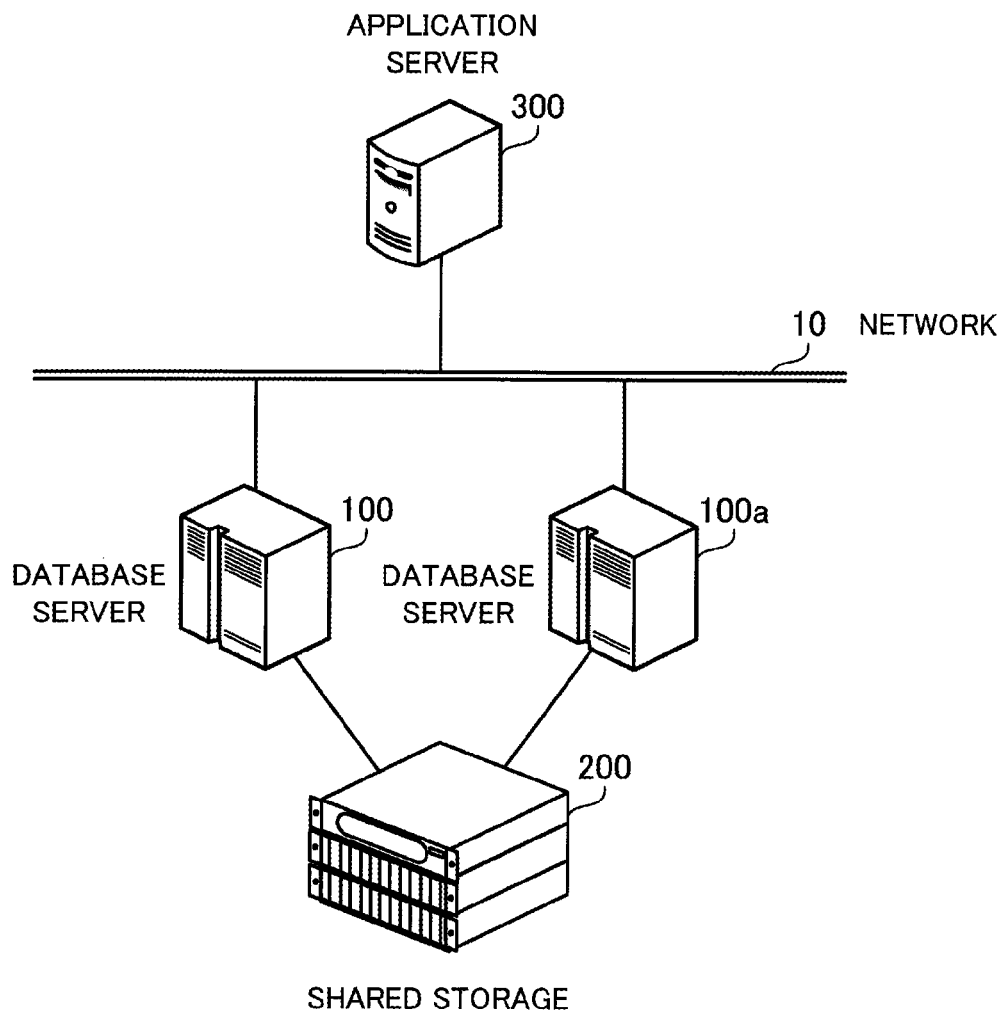
FIG. 2 illustrates an information processing system of a second embodiment.

FIG. 2 illustrates an information processing system of a second embodiment. The information processing system of the second embodiment includes database servers 100 and 100a, a shared storage 200, and an application server 300. The database servers 100 and 100a and the application server 300 are connected via a network 10. The network 10 may be a LAN (Local Area Network). The network 10 may be a wide area network, such as WAN (Wide Area Network) or the Internet.

The database servers 100 and 100a are connected to the shared storage 200. The database servers 100 and 100a and the shared storage 200 may be connected directly. The database servers 100 and 100a and the shared storage 200 may be connected via a LAN or a SAN (Storage Area Network). The database servers 100 and 100a and the shared storage 200 may be arranged at sites geographically distant from one another.

The database servers 100 and 100a are each a server computer storing a database. The contents of the databases stored in the database servers 100 and 100a are synchronized. One of the database servers 100 and 100a serves as the main system and the other serves as the sub-system. The main system database server accesses the database of the main system database server in response to an access request received from the application server 300 and returns the access result to the application server 300. The access request includes a reference request and an update request to the database. For example, when receiving a reference request to a record from the application server 300, the main system database server reads the target record in the database and returns the contents of the record to the application server 300. Here, updating the database includes adding data to the database, changing the setting value of the record included in the database, and deleting the record included in the database.

For example, when receiving an update request of a record from the application server 300, the main system database server updates the target record in the database and returns the update result of the record to the application server 300. When the record is updated in the main system database, the contents of the updates are also notified to the sub-system and the record of the sub-system database is also updated. The synchronization method of such databases is implemented by, for example, using the function called the log ship or the log shipping.

The sub-system database server reflects the update of record in the main system database server also in the database of the sub-system database server. The sub-system database server takes over the functions of the main system when the main system fails. In other words, in the information processing system of the second embodiment, even if one of the database servers 100 and 100a fails, it is possible to continue transactions by using the other. In this manner, failure resistance is improved. However, if the operation is continued by using only one of the database servers, it is no longer possible to continue transactions in the case where the database server fails. Because of this, the failed database server is restored and the operation by the main system and the sub-system is restored.

The shared storage 200 stores data for recovery of the database. For example, the main system database server periodically stores all the data of the database in the shared storage 200. All the data of the database acquired periodically is referred to as backup data. The period of acquisition of the backup data is a day, a week, etc.

There is a case where the most recent contents of the database are not reflected in the backup data. Because of this, the main system database server acquires history information (log) indicating the contents of updates of the database from the time point of acquisition of the backup data. The log may also be said as information storing the contents of the transactions to the database. The log is used to perform the operations again performed on the database. For example, by performing the operations of the log again after applying the backup data to the database to be restored, it is possible to recover the database forwardly.

For example, when receiving a request to update the database, the main system database server updates the database and also stores the log storing the update contents in the RAM of the main system database server. It may also be possible for the main system database server to write the log in the RAM before actually performing the operation in the database (entity of data). Such a method may be called a write ahead log (WAL) in some cases. For example, the main system database server arranges a plurality of log files on the RAM and writes the contents of the log in each log file in a round robin manner. The log arranged on the RAM may be referred to as an online log in some cases. The above-mentioned log ship may be said as a method for synchronizing the databases by sharing the online log with the sub-system.

The main system database server stores the contents of the online log in the shared storage 200 with a predetermined timing. For example, the predetermined timing is when the log file in which the online log is written is switched to another in the above-mentioned round robin manner, when the size of the online log reaches a predetermined size, when specification by a user is received, etc. The log stored in the shared storage 200 may be referred to as an archive log in some cases. The archive log may be stored in the shared storage 200 in plurality.

The archive log and the online log may be said as information storing the difference in the database between the time point when the backup data was acquired and the current time point. In other words, when it is desired to restore the database of the failed database server to the most recent state, first, the database is restored to the state at the time point when the backup data was acquired using the most recent backup data. Next, the operations performed on the database from the time point when the backup data was acquired to the time point when the most recent archive log was acquired are performed again using the archive log. Due to this, the database is restored up to the time point when the archive log was acquired. The procedure up to this is referred to as recovery in the following explanation. In other words, recovery includes restoration using the backup data and restoration using the archive log. When recovery is completed, the database servers 100 and 100a resume synchronization of the online log by the log ship and the operation by the main system and the sub-system is resumed.

The application server 300 transmits an access request for the database to the main system database server. In the application server 300, a plurality of pieces of application software (hereinafter, simply abbreviated to application or AP in some cases) is running. Each of the applications transmits an access request to the main system database server. The application server 300 may be provided in plurality. In other words, the main system database server may receive an access request for the database from a plurality of application servers.

It may also be possible to separately provide a server apparatus configured to receive an access request transmitted from the application server 300 and to transfer the access request to the main system database server. In this case, the application server 300 communicates with the main system database server via the server apparatus.

Figure 3:
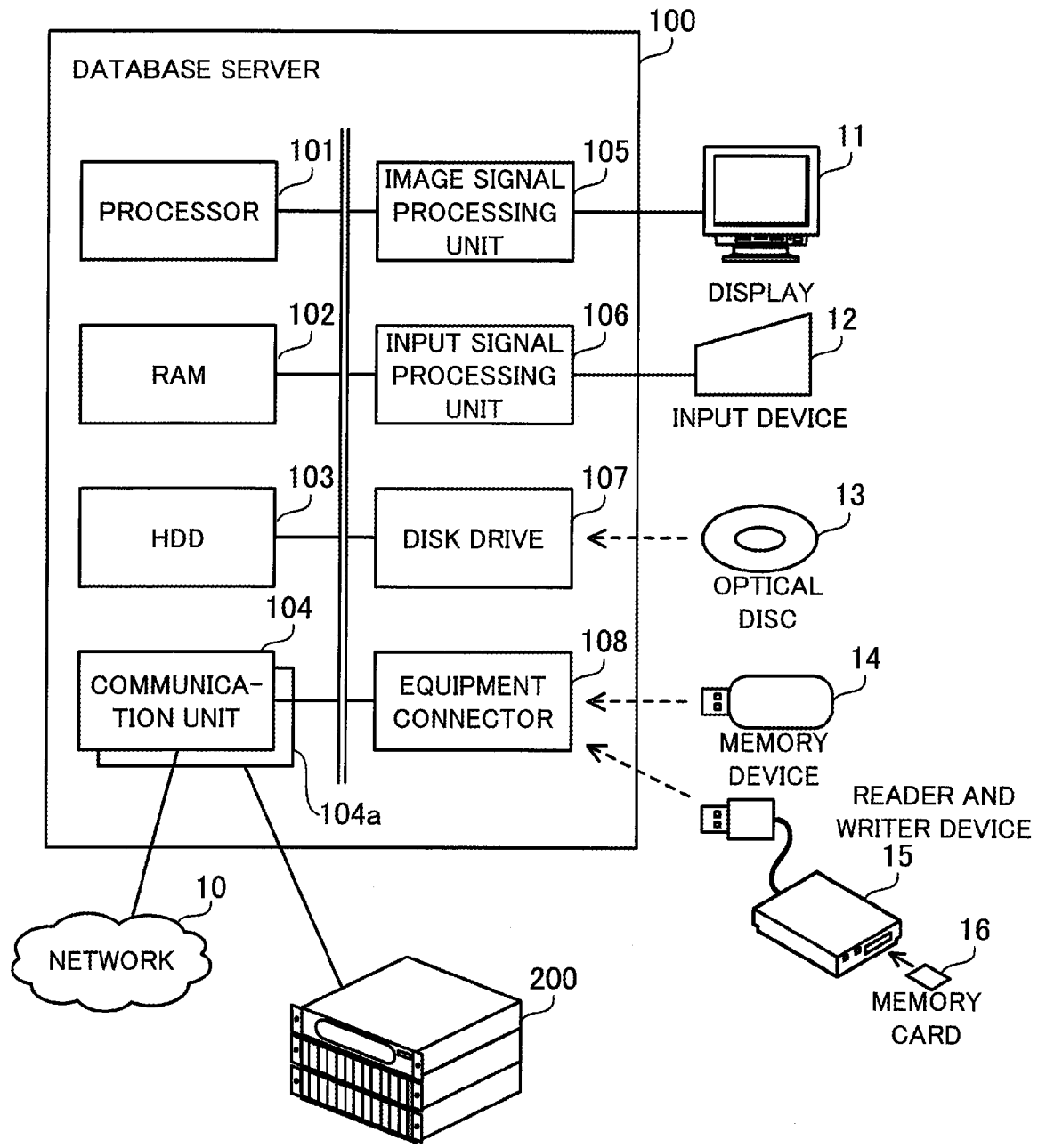
FIG. 3 illustrates a hardware example of a database server.

FIG. 3 illustrates a hardware example of the database server. The database server 100 has a processor 101, a RAM 102, an HDD 103, communication units 104 and 104a, an image signal processing unit 105, an input signal processing unit 106, a disk drive 107, and an equipment connector 108. Each unit is connected to the bus of the database server 100. The database server 100a and the application server 300 may be realized by using the same units as those of the database server 100.

The processor 101 controls information processing of the database server 100. The processor 101 may be a multiprocessor. The processor 101 is, for example, a CPU, a DSP, an ASIC, an FPGA, etc. The processor 101 may be a combination of two or more elements of a CPU, a DSP, an ASIC, an FPGA, etc.

The RAM 102 is a main storage device of the database server 100. The RAM 102 temporarily stores at least part of the programs of the OS (Operating System) and the programs of application executed by the processor 101. Further, the RAM 102 stores various kinds of data used in processing by the processor 101.

The HDD 103 is an auxiliary storage device of the database server 100. The HDD 103 magnetically writes data to and reads data from a built-in magnetic disc. In the HDD 103, the programs of the OS, programs of application, and various kinds of data are stored. The database server 100 may include another kind of auxiliary storage device, such as a flash memory and an SSD (Solid State Drive), and may include a plurality of auxiliary storage devices.

The communication unit 104 is an interface capable of communicating with another computer via the network 10. The communication unit 104 may be a wired interface or a wireless interface.

The communication unit 104a is an interface capable of communicating with the shared storage 200. As the interface, the FC (Fibre Channel), the SCSI (Small Computer System Interface), etc., may be used. The communication unit 104a writes data to the shared storage 200, reads data from the shared storage 200, etc., in accordance with the command from the processor 101. The shared storage 200 has a storage device, such as an HDD and an SSD. The shared storage 200 stores data in the storage device. Data stored in the shared storage 200 may be accessed from the database servers 100 and 100a.

The image signal processing unit 105 outputs an image on a display 11 connected to the database server 100 in accordance with the command from the processor 101. As the display 11, a CRT (Cathode Ray Tube) display, a liquid crystal display, etc., may be used.

The input signal processing unit 106 acquires an input signal from an input device 12 connected to the database server 100 and outputs the input signal to the processor 101. As the input device 12, for example, a pointing device, such as a mouse and a touch panel, a keyboard, etc., may be used.

The disk drive 107 is a drive apparatus configured to read programs and data stored in an optical disc 13 using laser light etc. As the optical disc 13, for example, a DVD (Digital Versatile Disc), a DVD-RAM, a CD-ROM (Compact Disc Read Only Memory), a CD-R (Recordable)/RW (ReWritable), etc., may be used. The disk drive 107 stores programs and data read from the optical disc 13 in the RAM 102 or the HDD 103, for example, in accordance with the command from the processor 101.

The equipment connector 108 is a communication interface configured to connect a peripheral to the database server 100. For example, to the equipment connector 108, a memory device 14 and a reader and writer device 15 may be connected. The memory device 14 is a storage medium equipped with the function to communicate with the equipment connector 108. The reader and writer device 15 is a device configured to write data to a memory card 16 and to read data from the memory card 16. The memory card 16 is a card type storage medium. The equipment connector 108 stores programs and data read from the memory device 14 or the memory card 16 in the RAM 102 or the HDD 103, for example, in accordance with the command from the processor 101.

Figure 4:
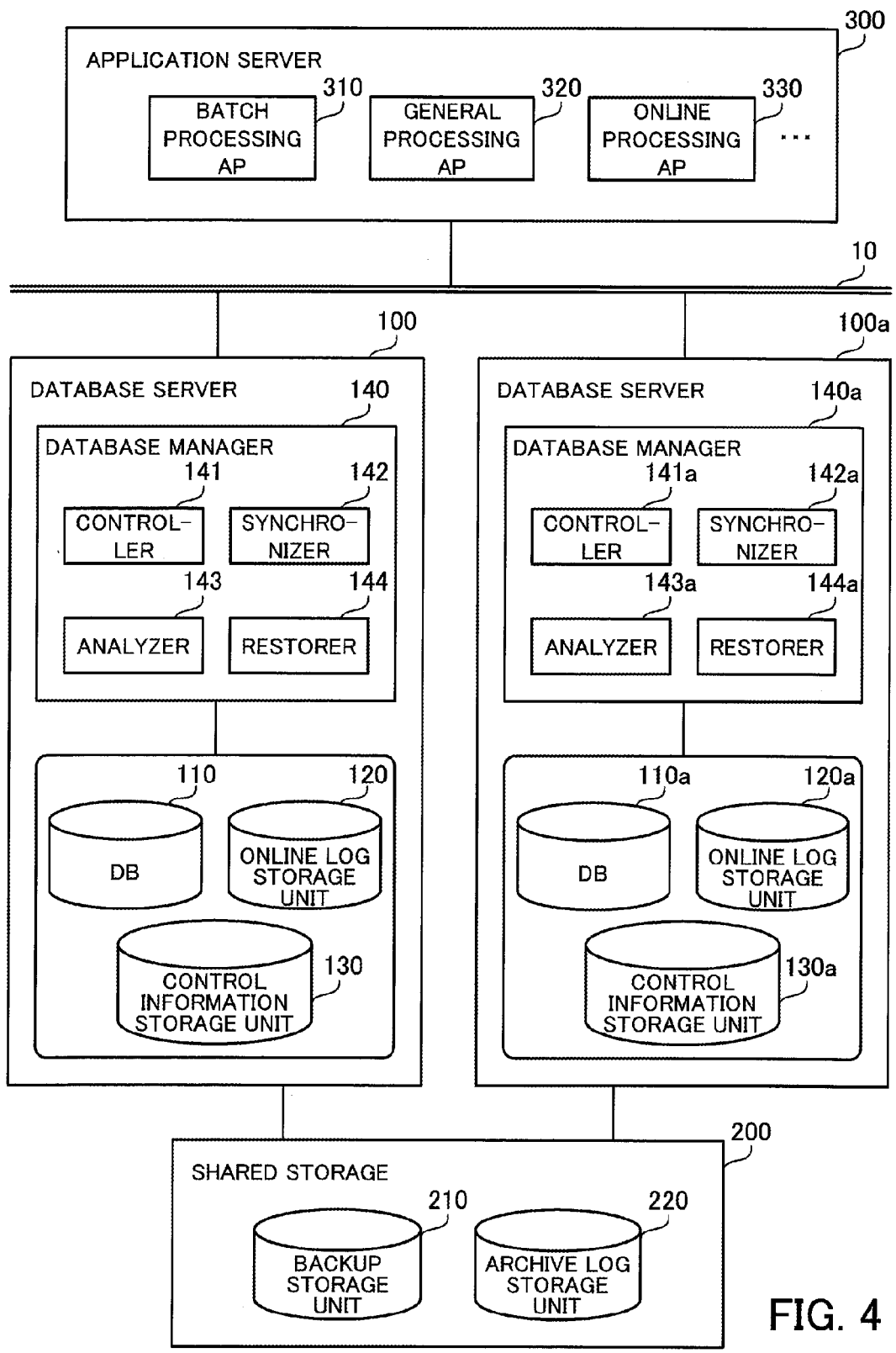
FIG. 4 illustrates an example of functions of an information processing system.

FIG. 4 illustrates an example of functions of the information processing system. The database server 100 has a database 110, an online log storage unit 120, a control information storage unit 130, and a database manager 140. The database 110 and the control information storage unit 130 may be realized as a storage area secured in the RAM 102 or the HDD 103. The online log storage unit 120 may be realized as a storage area secured in the RAM 102. The database manager 140 may be realized as a software module executed by the processor 101. Here, each function is explained assuming a case where the database server 100 is the main system and the database server 100*a* is the sub-system in FIG. 4.

The database 110 stores various kinds of data groups used in processing of each application that runs on the application server 300. The online log storage unit 120 stores an online log for the database 110. The control information storage unit 130 stores various kinds of data used in processing by the database manager 140.

The database manager 140 accesses the database 110, generates an online log, and generates an archive log. The database manager 140 has a controller 141, a synchronizer 142, an analyzer 143, and a restorer 144.

The controller 141 accesses the database 110 in response to an access request received from the application server 300 and returns the access result to the application server 300. The contents of the reference and update of data of the database 110 are expressed by, for example, an SQL sentence. The controller 141 may refer to and update the database 110 by executing the SQL sentence in accordance with the access request. The controller 141 generates an online log storing the contents of the operations performed on the database 110 in accordance with the reference and the update and stores the online log in the online log storage unit 120. Further, the controller 141 limits the update of the database 110 in accordance with instructions of the analyzer 143.

The synchronizer 142 sends the online log stored in the online log storage unit 120 to the database server 100*a* and synchronizes each database stored in the database servers 100 and 100*a* (log ship). For example, it is considered that the synchronizer 142 may send new contents stored in the online log to the database server 100*a* in a predetermined period (e.g., about several seconds to several minutes).

The analyzer 143 monitors and analyzes the state of recovery and the state of generation of a new archive log by the controller 141 during recovery of the database in the database server 100*a*. The analyzer 143 instructs the controller 141 to limit the update of the database 110 in accordance with the analysis result.

The restorer 144 performs recovery of the database 110. Specifically, the restorer 144 restores the database 110 up to the time point when the backup data was acquired using the backup data stored in the shared storage 200. Further, the restorer 144 restores the database 110 up to the time point when the archive log was acquired the last time using the archive log stored in the shared storage 200.

The database server 100*a* has a database 110*a*, an online log storage unit 120*a*, a control information storage unit 130*a*, and a database manager 140*a*. The database 110*a*, the online log storage unit 120*a*, the control information storage unit 130*a*, and the database manager 140*a* have the same functions as those of the units with the same names of the database server 100, respectively. Like the database manager 140, the database manager 140*a* has a controller 141*a*, a synchronizer 142*a*, an analyzer 143*a*, and a restorer 144*a*. Here, assuming the case where the database server 100*a* is the sub-system, the processing of each unit of the database manager 140*a* partially differs from the processing of the database manager 140.

The controller 141*a* updates the database 110*a* using the online log stored in the online log storage unit 120*a*. The synchronizer 142*a* receives the online log in accordance with the update of the database 110 from the database server 100 and stores the online log in the online log storage unit 120*a*.

When the database server 100*a* operates as the main system, the analyzer 143*a* exhibits the same function as that of the analyzer 143. The restorer 144*a* performs recovery of the database 110*a*. The specific method is the same as that of the restorer 144.

Here, the databases 110 and 110*a* are assumed to be stored in the database servers 100 and 100*a*, but may be stored in apparatuses other than the database servers 100 and 100*a*. For example, the databases 110 and 110*a* may be stored in storage devices externally attached to the database servers 100 and 100*a*, respectively, or may be stored in storage devices connected to the database servers 100 and 100*a* via the network 10.

The shared storage 200 has a backup storage unit 210 and an archive log storage unit 220. The backup storage unit 210 and the archive log storage unit 220 may be realized as a storage area secured in the HDD or the SSD included in the shared storage 200.

The backup storage unit 210 stores backup data acquired periodically by the database server 100 or the database server 100*a*. The archive log storage unit 220 stores an archive log.

The application server 300 executes a plurality of kinds of applications. For example, the applications include a batch processing AP 310, a general processing AP 320, and an online processing AP 330. The batch processing AP 310 is a set of applications programmed to perform batch processing. The general processing AP 320 is a set of applications programmed to perform general processing performed separately from the main transactions performed in a second information processing system. The online processing AP 330 is a set of applications programmed to perform the main transactions performed in the second information processing system. The batch processing AP 310, the general processing AP 320, and the online processing AP 330 access the database 110 when performed. Each application executed on the application server 300 may be executed on each individual application server.

FIG. 5 illustrates an example of an SQL priority table. An SQL priority table 131 is stored in advance in the control information storage unit 130. The SQL priority table 131 includes items of the SQL priority and the application classification.

In the item of the SQL priority, a value indicating the SQL priority is registered. It is assumed that the larger the value of the SQL priority, the higher priority is given. In the item of the application classification, information indicating the classification of application (hereinafter, referred to as application classification in some cases) is registered. The application classification corresponds to the kind of application executed on the application server 300. For example, the application classification includes "batch processing", "general processing", "online processing", etc.

For example, in the SQL priority table 131, information indicating that the SQL priority is "1" and the application classification is "batch processing" is registered. This means that the SQL priority of the application whose application classification is "batch processing" is "1". The SQL priority of "1" is the lowest priority.

According to the SQL priority table 131, the SQL priority of the application whose application classification is "general processing" is "2" and the SQL priority is higher than that of the application whose application classification is "batch processing" by one rank. Further, the SQL priority of the application whose application classification is "online processing" is "3" and the SQL priority is higher than that of the application whose application classification is "general processing" by one rank. In FIG. 5, the application classification whose SQL priority is "4" or higher is not illustrated.

FIG. 6 illustrates an example of a no-update probability table. A no-update probability table 132 is obtained by finding a probability that the database 110 is not updated for each elapsed time when updates of the database 110 are limited for the applications whose SQL priorities are lower than a priority threshold. The no-update probability table 132 is stored in the control information storage unit 130. The no-update probability table 132 is generated by the analyzer 143. The no-update probability table 132 includes items of the priority threshold and the no-update probability.

In the items of the priority threshold, the priority thresholds are registered. In the items of the no-update probability, the probabilities that the database 110 is not updated (no-update probability) for elapsed times are registered.

For example, in the no-update probability table 132, registered are information such that the priority threshold is "1", the no-update probability for one minute is "80%", the no-update probability for two minutes is "67%", the no-update probability for three minutes is "55%", . . . . This means that in the case where all the applications that access the database 110 update the database 110, the probability that the database 110 is not updated for one minute is "80%". Further, in the same case, this means that the probability that the database 110 is not updated for two minutes is "67%" and the probability that the database 110 is not updated for three minutes is "55%".

Further, for example, in the no-update probability table 132, registered are information such that the priority threshold is "2", the no-update probability for one minute is "83%", the no-update probability for two minutes is "70%", the no-update probability for three minutes is "60%", . . . . This means that in the case where the applications whose SQL priority is "2" or higher update the database 110, the probability that the database 110 is not updated for one minute is "83%". Further, in the same case, this means that the probability that the database 110 is not updated for two minutes is "70%" and the probability that the database 110 is not updated for three minutes is "60%".

In the no-update probability table 132, in the case where the priority threshold is the same, the longer the time, the higher becomes the possibility that an update request is received, and therefore, the no-update probability tends to decrease. In the case where the elapsed time is the same, the higher the priority threshold, the fewer becomes the number of applications that update the database 110, and therefore, the no-update probability tends to increase.

Further, as will be described later, the database server 100 selects the priority threshold and accepts the database update for the application classification whose SQL priority is equal to or higher than the priority threshold and limits the database update for the application classification whose SQL priority is lower than the priority threshold. In other words, the priority threshold may be said to indicate the selection pattern of the application classification for which the database update is limited. For example, the priority threshold of "1" indicates that the database update is not limited for any application classification. For example, the priority threshold of "3" indicates that the database update is limited for the application classification whose priority threshold is "1" or "2".

FIG. 7 illustrates an example of an access statistics table. Access statistics tables 133, 133*a*, 133*b*, . . . , are created in order to obtain the no-update probability table 132. The access statistics tables 133, 133*a*, 133*b*, . . . , are stored in the control information storage unit 130. The access statistics tables 133, 133*a*, 133*b*, . . . , are generated by the analyzer 143.

The access statistics tables 133, 133*a*, 133*b*, . . . , are generated for a plurality of ranges of the SQL priority. The plurality of ranges of the SQL priority includes ranges of the SQL priority of "1 or higher", "2 or higher", "3 or higher", . . . . For example, the access statistics table 133 includes information obtained by performing measurement for the application classification whose SQL priority is "1 or higher". The access statistics table 133*a* includes information obtained by performing measurement for the application classification whose SQL priority is "2 or higher". The access statistics table 133*b* includes information obtained by performing measurement for the application classification whose SQL priority is "3 or higher".

The access statistics tables 133, 133*a*, 133*b*, . . . , include items of the time, the number of measurements, the number of updates, and the no-update probability. In the items of the time, the accumulated measured times (elapsed times) are registered. In the items of the number of measurements, the numbers of received access requests are registered. In the items of the number of updates, the numbers of received update requests are registered. In the items of the no-update probability, the ratios of (the number of measurements—the number of updates) to the number of measurements are registered.

For example, in the access statistics table 133, information indicating that the time is "one minute", the number of measurements is "20", the number of updates is "4", and the no-update probability is "80%" is registered. This means that the access request is received 20 times for one minute from the start of measurement from the applications belonging to the application classification whose SQL priority is "1 or higher" (i.e., the applications belonging to all the application classifications) and the update request is made four times among the 20 access requests. In this case, the no-update probability is calculated as $\{(20-4)/20\} \times 100 = 80\%$. Similarly, in the access statistics table 133, the no-update probability for each accumulated time, such as two minutes, three minutes, . . . , is stored. This also applies to the access statistics tables 133*a*, 133*b*, . . . .

It is possible for the controller 141 and the analyzer 143 to identify from which application the access request is received by an identifier of the application included in the access request (e.g., identifier of the application attached to the SQL sentence). In the control information storage unit 130, information is stored in advance, which indicates to which application classification each application belongs. It is possible for the controller 141 and the analyzer 143 to grasp the number of measurements and the number of updates for each application classification by referring to the information. By accumulating the number of measurements and the number of updates for each application classification for each range of the SQL priority and for each elapsed time, the access statistics tables 133, 133a, 133b, . . . , are obtained.

Next, the processing of the second embodiment is illustrated. In the following explanation, first, a case is assumed where the database server 100 is the sub-system and the database server 100a is the main system. After that, when the database server 100a fails, the database server 100 is switched to the main system.

Figure 8:
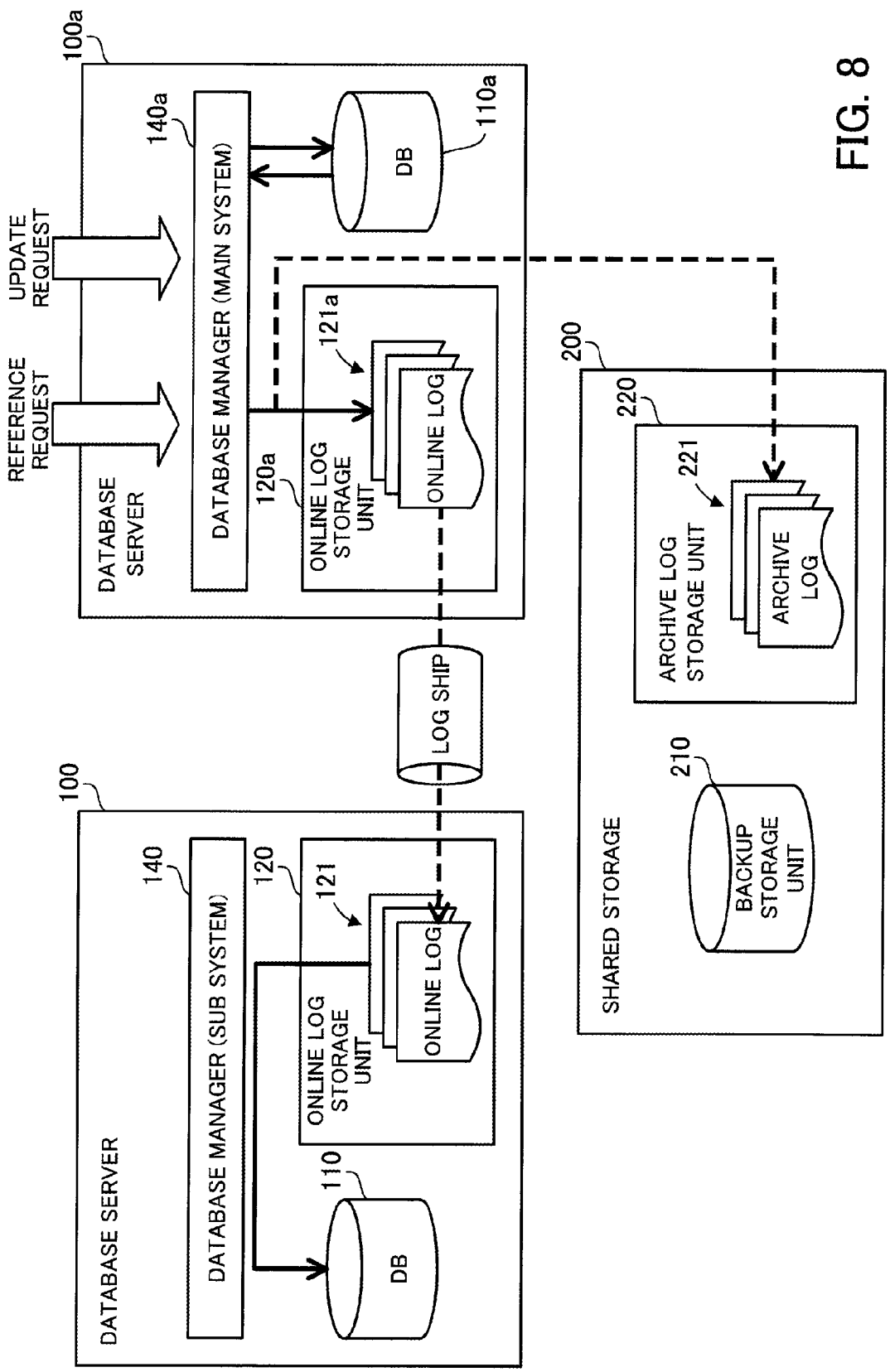
FIG. 8 illustrates an output example of a log.

FIG. 8 illustrates an output example of a log. The database manager 140a receives a reference request from the application server 300. In response to the reference request, the database manager 140a reads data from the database 110a and returns the data to the application server 300. The database manager 140a receives an update request from the application server 300. In response to the update request, the database manager 140a updates the database 110a. The database manager 140a writes the contents of the update of an online log 121a. The database manager 140a stores the online log 121a in the online log storage unit 120a.

The online log 121a is sent also to the database server 100 by the log ship function and is stored in the online log storage unit 120 as an online log 121. The database manager 140 reflects the contents of the update of the database 110a also in the database 110 using the online log 121.

The database manager 140a generates an archive log 221 from the online log 121a with a predetermined timing and stores the archive log 221 in the archive log storage unit 220. The processing when the database server 100a fails in the normal operation state such as this is illustrated below. Even if the functions of the database servers 100 and 100a are reversed, the procedure is the same except in that the system that performs the processing changes.

Figure 9:
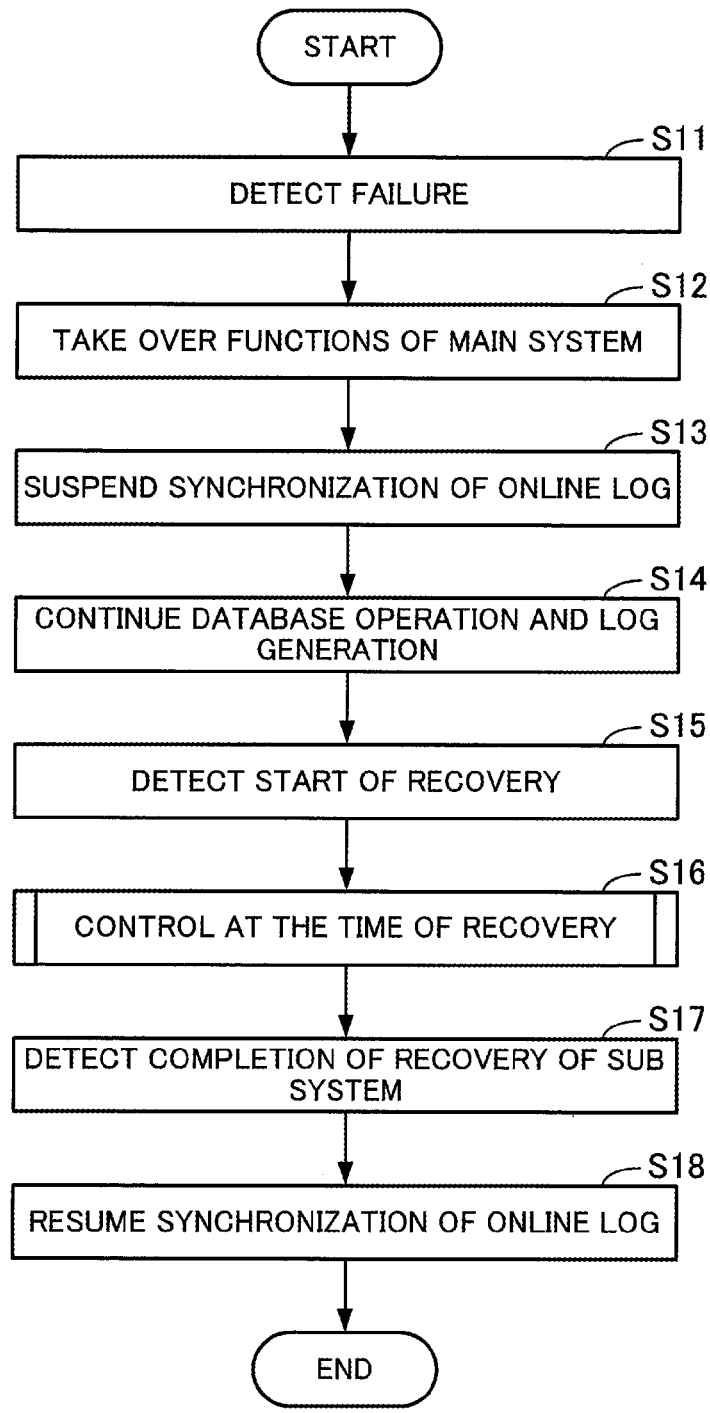
FIG. 9 is a flowchart illustrating an example of processing in a main system at the time of a failure.

FIG. 9 is a flowchart illustrating an example of the processing of the main system when a failure occurs. Hereinafter, the processing illustrated in FIG. 9 is explained in order of the step number.

(S11) The controller 141 detects a failure of the database server 100a. For example, the database servers 100 and 100a may determine whether or not the main system side is down by periodically performing predetermined communication for monitoring whether or not the system is down. For example, the controller 141 may detect a failure of the database server 100a, which is the main system, by detecting that the communication for monitoring whether or not the system is down is no longer available. Alternatively, the controller 141 may detect the failure by receiving notification to the effect that the database server 100a has failed from a terminal apparatus for management connected to the network 10.

(S12) The controller 141 takes over the functions of the main system from the database server 100a. Thus, the database server 100 operates as the main system. From now on, the database server 100 receives access requests from the application server 300 in place of the database server 100a. The database server 100 also takes over the functions to generate the online log and the archive log.

(S13) The controller 141 instructs the synchronizer 142 to suspend synchronization of the online log. The synchronizer 142 suspends synchronization of the online log.

(S14) The controller 141 receives access requests from the application server 300 and continues the operation of the database 110. The controller 141 continues generation of the online log and the archive log in accordance with the update of the database 110. The controller 141 stores the generated online log in the online log storage unit 120. The controller 141 stores the generated archive log in the archive log storage unit 220.

(S15) The controller 141 detects the start of recovery in the database server 100a by receiving notification of the start of recovery from the database server 100a.

(S16) The controller 141 performs access control at the time of recovery of the database 110. The specific contents of the access control by the controller 141 are determined by the analyzer 143, as will be described later.

(S17) The controller 141 detects the completion of recovery of the database server 100a. The database server 100a will operate as the sub-system.

(S18) The controller 141 instructs the synchronizer 142 to resume synchronization of the online log. If the update of the database 110 is limited for some applications, the controller 141 cancels the limitation. The synchronizer 142 resumes synchronization of the online log with the synchronizer 142a.

In this manner, the database server 100 takes over the functions of the main system when the database server 100a fails, which is the main system. Then, when the recovery of the database server 100a is completed, synchronization of the online log is resumed and the redundant operation by the database servers 100 and 100a is resumed.

Here, at step S11, the database server 100 is the sub-system and the database server 100a is the main system, but the procedure is the same also when the database server 100 is the main system and the database server 100a is the sub-system. In this case, the database server 100 may skip the processing at step S12 and perform the processing at step S13.

Figure 10:
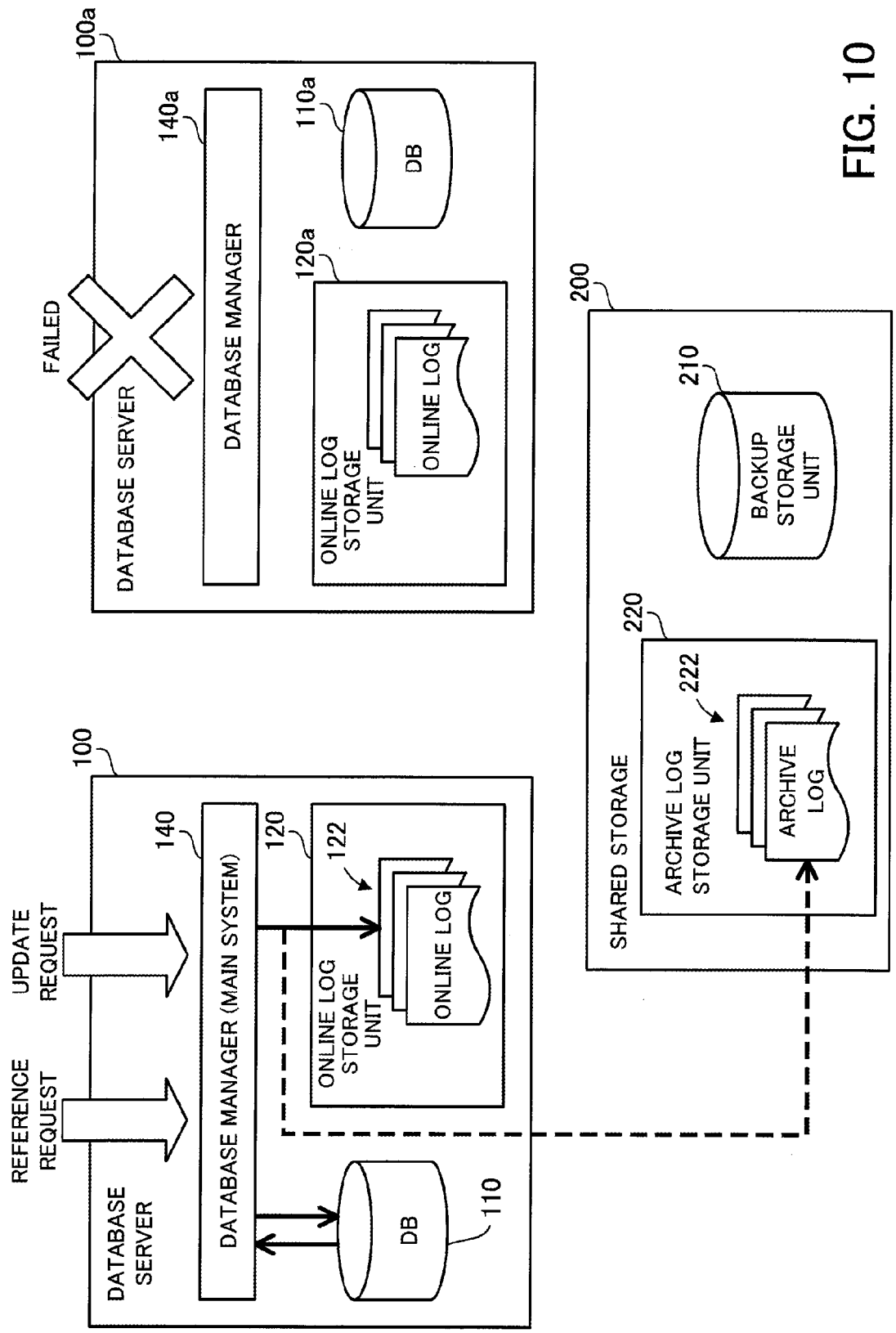
FIG. 10 illustrates an output example of a log at the time of one system operation.

FIG. 10 illustrates an output example of a log at the time of one system operation. FIG. 10 illustrates generation of the online log and the archive log by the database server 100 at step S14 in FIG. 9. In this case, the database manager 140 generates an online log 122 in accordance with the update of the database 110 and stores the online log 122 in the online log storage unit 120. Further, the database manager 140 generates an archive log 222 with a predetermined timing and stores the archive log 222 in the archive log storage unit 220. Because the database server 100a is down, the function of the log ship is suspended (synchronization of the online log between the database servers 100 and 100a is not performed). Next, the recovery processing of the database server 100a is explained.

Figure 11:
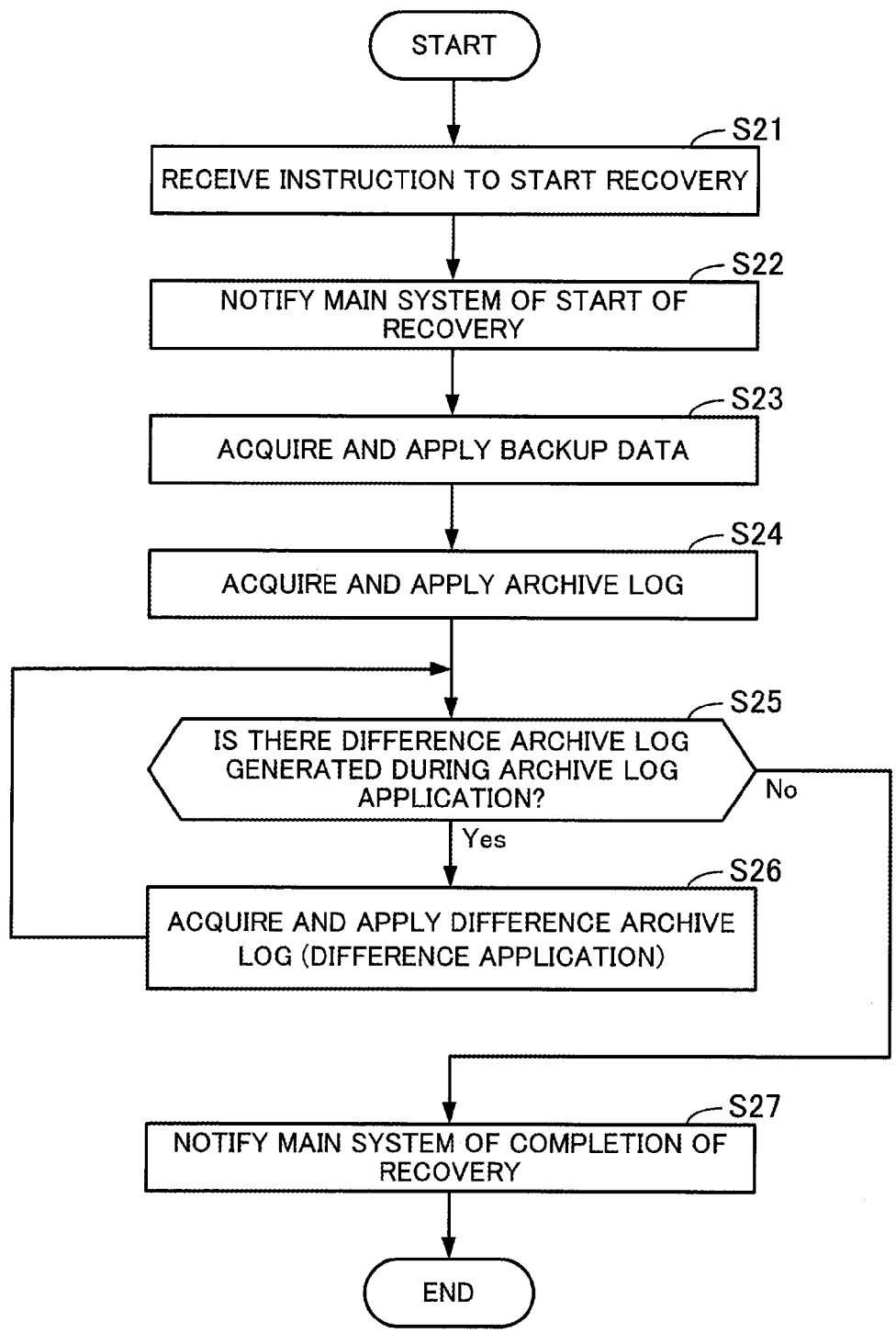
FIG. 11 is a flowchart illustrating an example of recovery processing of a sub-system.

FIG. 11 is a flowchart illustrating an example of the recovery processing of the sub-system. Hereinafter, the processing illustrated in FIG. 11 is explained in order of the step number.

(S21) The controller 141a receives an instruction to start recovery. The controller 141a may receive the instruction to start recovery by receiving a predetermined operation of a user to the input device connected to the database server 100a. The controller 141a may receive the instruction to start recovery from a predetermined terminal apparatus for management connected to the network 10.

(S22) The controller 141a notifies the database server 100 of the start of recovery. The controller 141a causes the restorer 144a to start recovery.

(S23) The restorer 144a notifies the database server 100 of the start of application of backup data. The restorer 144a acquires backup data stored in the backup storage unit 210 and applies the backup data to the database 110a. Due to this, the database 110a is restored up to the time point when the backup data was generated. The restorer 144a notifies the database server 100 of the completion of application of the backup data.

(S24) The restorer 144a notifies the database server 100 of the start of application of an archive log. The restorer 144a acquires an archive log stored in the archive log storage unit 220 and applies the archive log to the database 110a. Due to this, the database 110a is restored up to the time point when the archive log was generated. The restorer 144a notifies the database server 100 of the completion of application of the archive log. Even while step S24 is being performed, the database 110 may be updated in the database server 100.

(S25) The restorer 144a refers to the archive log storage unit 220 and determines whether or not there is a new archive log (also referred to as a difference archive log in some cases) generated by the database server 100 during the application of the archive log. When there is a difference archive log, the processing proceeds to step S26. When there is no difference archive log, the processing proceeds to step S27.

(S26) The restorer 144a notifies the database server 100 of the start of application of the difference archive log (start of difference application). The restorer 144a acquires the difference archive log stored in the archive log storage unit 220 and applies the difference archive log to the database 110a. In the following explanation, this processing is referred to as difference application in some cases. Due to this, the database 110a is restored up to the time point when the difference archive log was generated. The restorer 144a notifies the database server 100 of the completion of application of the difference archive log (completion of difference application). Then, the processing proceeds to step S25. When step S25 is performed after step S26, the restorer 144a will determine whether or not there is another difference archive log generated during the application of the difference archive log.

(S27) The restorer 144a notifies the controller 141a of the completion of recovery. The controller 141a notifies the database server 100 of completion of the recovery of the database 110a (the restorer 144a may make this notification).

In this manner, the recovery of the database 110a in the database server 100a is performed. Next, a specific example of the recovery of the database 110a by the database server 100a is explained.

Figure 12:
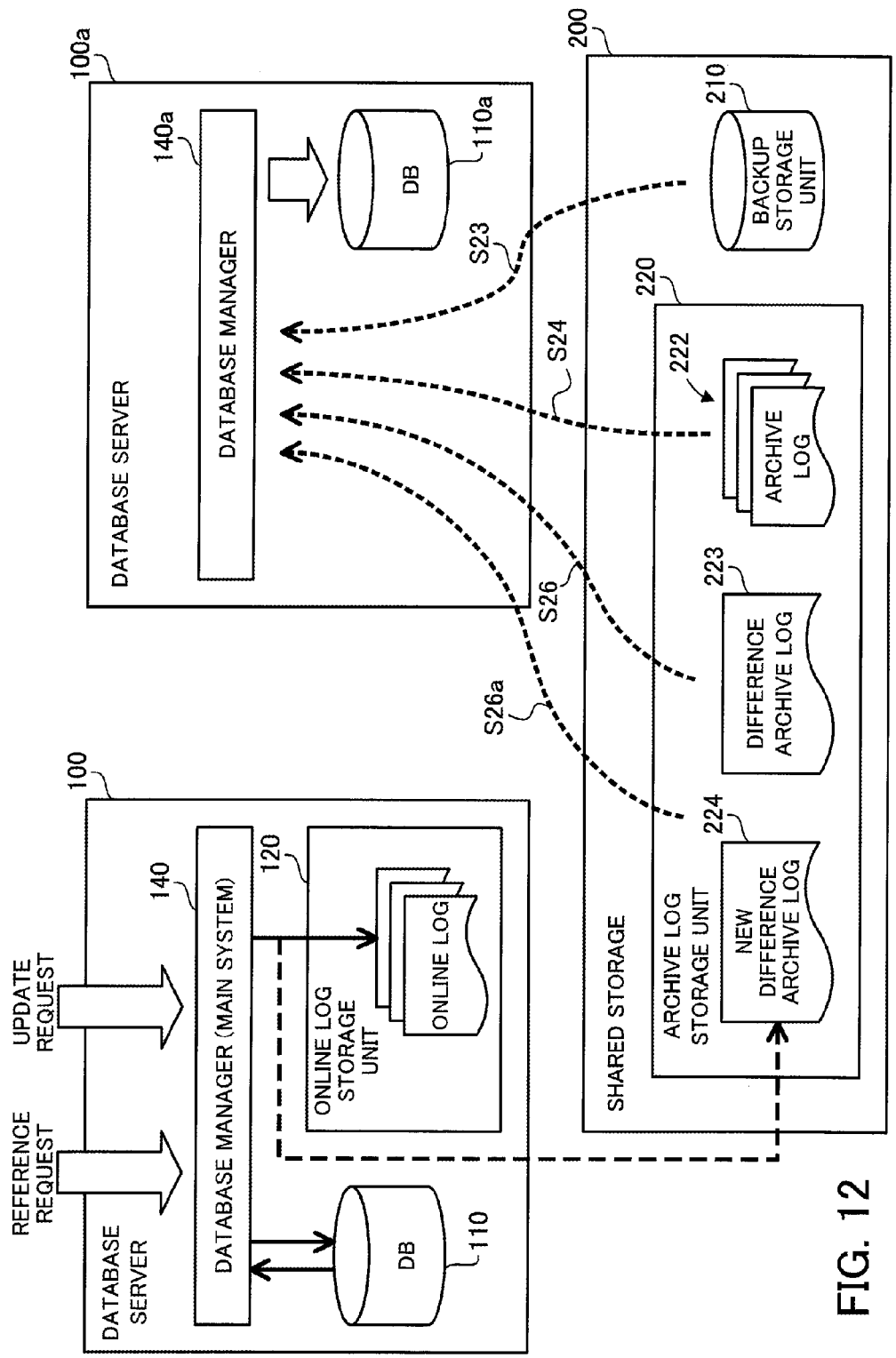
FIG. 12 illustrates a specific example of recovery.

FIG. 12 illustrates a specific example of recovery. The database manager 140a reads backup data from the backup storage unit 210 and applies the backup data to the database 110a (step S23). The database manager 140a reads the archive log 222 from the archive log storage unit 220 and applies the archive log 222 to the database 110a (step S24). While the archive log 222 is being provided to the database 110a also, a difference archive log 223 is generated by the database manager 140 and is stored in the archive log storage unit 220.

The database manager 140a reads the difference archive log 223 from the archive log storage unit 220 and applies the difference archive log 223 to the database 110a (step S26). While the difference archive log 223 is being applied to the database 110a also, a new difference archive log 224 is generated by the database manager 140 and is stored in the archive log storage unit 220. When the application of the difference archive log 223 is completed, the database manager 140a reads the new difference archive log 224 from the archive log storage unit 220 and applies the difference archive log 224 to the database 110a (step S26a).

In this manner, the database manager 140a acquires difference archive logs in order of generation and sequentially applies the difference archive logs until there is no difference archive log that is not applied yet. Next, the procedure at step S16 in FIG. 9 is explained.

Figure 13:
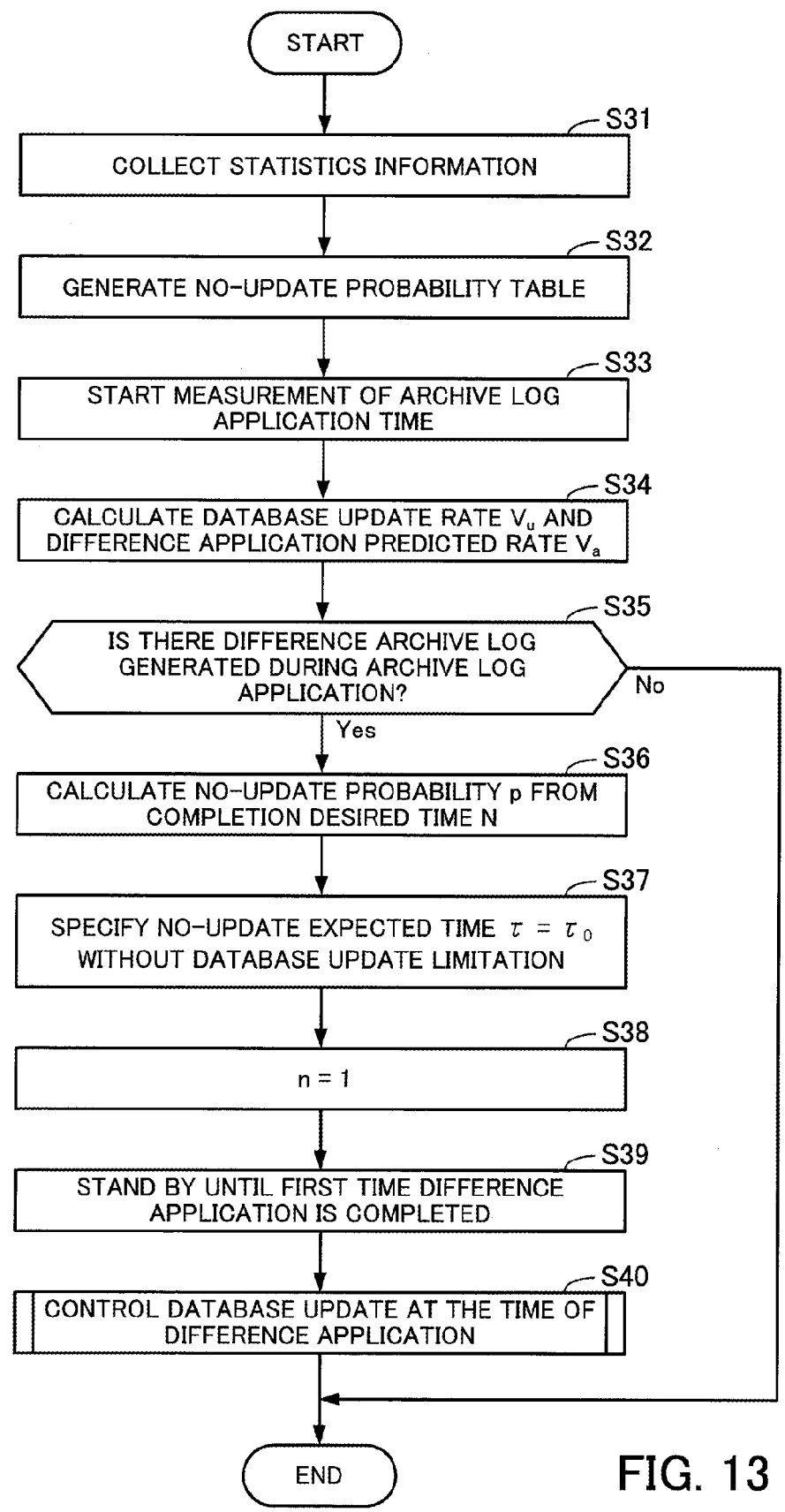
FIG. 13 is a flowchart illustrating an example of control of the main system at the time of sub-system recovery.

FIG. 13 is a flowchart illustrating an example of control of the main system at the time of recovery of the sub-system. Hereinafter, the processing illustrated in FIG. 13 is explained in order of the step number.

(S31) The controller 141 causes the analyzer 143 to start analysis. The analyzer 143 collects statistics information. Specifically, the analyzer 143 refers to the access request received from the application server 300, generates the access statistics tables 133, 133a, 133b, . . . , and stores the access statistics tables 133, 133a, 133b, . . . , in the control information storage unit 130. Further, the analyzer 143 stores the amount of data to be updated (e.g., amount of data written to the online log), the time of reception of the update, etc., and stores the amount and the time in the control information storage unit 130. For example, the analyzer 143 may collect the statistics information based on the access request to the database 110 received while the application of the backup data is being performed by the database server 100a. Further, the analyzer 143 measures the time taken to apply the backup data based on the notifications of the start and completion of application of the backup data at step S23 in FIG. 11 and stores the time in the control information storage unit 130.

(S32) The analyzer 143 generates the no-update probability table 132 based on the access statistics tables 133, 133a, 133b, . . . , stored in the control information storage unit 130 and stores the no-update probability table 132 in the control information storage unit 130.

(S33) The analyzer 143 receives the notification of the start of application of an archive log from the database server 100a. The notification of the start of application of an archive log corresponds to the notification of the start of application at step S24 explained in FIG. 11. The analyzer 143 starts measurement of the application time of the archive log. The measurement of the application time of the archive log is performed in order to grasp the accumulated time (total application time) taken to apply the archive log (including the difference archive log).

(S34) The analyzer 143 calculates a database update rate Vu based on the statistics information collected at step S31. The database update rate Vu may be calculated by dividing the amount of data updated during the application of backup data (e.g., amount of data written to the archive log) by the application time. The database update rate Vu may be considered as a predicted value of an average increase in the amount of the archive log per unit time. Further, the analyzer 143 receives the notification of the completion of application of the archive log from the database server 100a. The notification of the completion of application of the archive log corresponds to the notification of the completion of application at step S24 explained in FIG. 11. Then, the analyzer 143 calculates a difference application predicted rate Va based on the size of the archive log whose application is completed at step S24 and the time taken for application. The difference application predicted rate Va is an average size of the archive log applied per unit time (this is used as a predicted value of the application rate of the difference archive log). Both Vu and Va may be expressed in units, for example, such as bytes per sec.

(S35) The analyzer 143 refers to the archive log storage unit 220 and determines whether or not there is a difference archive log generated during the application of the archive log. When there is a difference archive log, the processing proceeds to step S36. When there is no difference archive log, the processing is ended. The analyzer 143 may perform the determination by monitoring whether or not a difference archive log is generated by the controller 141 during the application of the archive log.

(S36) The analyzer 143 calculates a no-update probability p to be secured based on a completion desired time N. The completion desired time N is a time specified in advance by a user as the time that may be spent for restoration of the database 110a using all the difference archive logs. The analyzer 143 determines the no-update probability p so that the application of all the difference archive logs is completed within the time N. Specifically, the completion desired time N is expressed as Expression (1) using an update probability $q=1-p$. Expression (1) may be transformed into Expressions (2), (3), and (4).

$$N = \frac{S}{V_a} + \frac{S}{V_a} \cdot q \cdot \frac{V_u}{V_a} + \frac{S}{V_a} \cdot \left(q \cdot \frac{V_u}{V_a}\right)^2 + \ldots \quad (1)$$

$$= \sum_{n=0}^{\infty} \frac{S}{V_a} \cdot \left(q \cdot \frac{V_u}{V_a}\right)^n \quad (2)$$

$$= \frac{S}{V_a} \sum_{n=0}^{\infty} \left(q \cdot \frac{V_u}{V_a}\right)^n \quad (3)$$

$$= \frac{S}{V_a} \cdot \frac{1}{1 - q \cdot \frac{V_u}{V_a}} \left(\because -1 < q \cdot \frac{V_u}{V_a} < 1\right) \quad (4)$$

Here, S is the size of the first difference archive log (e.g., in units of bytes). Expression (2) is obtained by rewriting Expression (1) using a sum symbol. Expression (3) is obtained by moving the coefficient of Expression (2) to before the sum symbol. In Expression (3), $0 \leq q \leq 1$ holds. Because the application of the archive log is accompanied by continuous database updates, the amount of updates per unit time is considered to be larger than the amount of normal updates of the database by update requests, and therefore, $0 < Vu/Va < 1$ may be considered to hold. Consequently, $0 < q \times (Vu/Va) < 1$ holds. This relationship is used when Expression (3) is transformed into Expression (4). By solving Expression (4) with respect to q, Expression (5) is obtained.

$$q = \frac{V_a}{V_u} \cdot \left(1 - \frac{S}{N \cdot V_a}\right) \quad (5)$$

The relationship between the no-update probability p and the update probability q is expressed by Expression (6), and therefore, the no-update probability p is expressed by Expression (7).

$$p = 1 - q \quad (6)$$

$$= 1 - \frac{V_a}{V_u} \cdot \left(1 - \frac{S}{N \cdot V_a}\right) \quad (7)$$

By substituting the measured Vu, Va, and S and the value of N given in advance by a user in Expression (7), the no-update probability p is obtained. As the time N, for example, an input of a value by a user in accordance with the operation, such as 60 min (3,600 sec) and 120 min (7,200 sec), is accepted. In other words, in order to complete the application of all the difference archive logs within the completion desired time N, it is preferable for each difference archive log to be applied within a time during which the no-update probability p or higher is maintained for the database 110.

(S37) The analyzer 143 refers to the no-update probability table 132 for the no-update probability p calculated at step S36 and specifies the maximum time during which the no-update probability p or higher is secured without limitation to the database update (i.e., with the priority threshold of "1") as a no-update expected time $\tau = \tau_0$. For example, according to the no-update probability table 132, when p=60%, $\tau_0=2$ min. Here, $\tau_0$ is the initial value of the no-update expected time (time during which the database 110 is expected not to be updated).

(S38) The analyzer 143 substitutes one for a variable n. Here, the variable n is a variable for managing the number of times of difference application.

(S39) The analyzer 143 receives the notification of the start of the first time difference application. The notification of the start of difference application corresponds to the notification of the start of the first time difference application at step S26 explained in FIG. 11. The analyzer 143 stands by until the first time difference application is completed. During the first time difference application, the update of the database 110 is not limited. The analyzer 143 detects that the first time difference application is completed by receiving the notification of the completion of the first time difference application from the database server 100a.

(S40) The analyzer 143 performs database update control at the time of difference application. Details of the processing will be described later.

Here, as illustrated at step S31, by collecting statistics information during recovery, the update of the database 110 may be limited based on the most recent access state. However, a method for collecting statistics information may be determined by a user. For example, the analyzer 143 may create the access statistics tables 133, 133a, 133b, . . . , before the recovery of the database 110a is started. Specifically, it may also be possible to acquire the access statistics of the whole of the same day of the previous week from the backup etc. of the archive log. By doing so, it is possible to limit the update of the database 110 based on the access state for each day of the week.

In the access statistics tables 133, 133a, 133b, . . . , the units of time in which statistics information is collected are taken to be one minute and the no-update probability is acquired in units of minutes (of the elapsed time), but other units of time may be accepted. For example, units of 30 sec, 5 min, 10 min, 30 min, etc., may be accepted.

It may also be possible to determine a time for collecting statistics information. For example, it may also be possible to collect statistics information by determining a time range, such as for 30 min and for one hour. Further, it may also be possible to collect statistics information by giving in advance an amount of increase in the archive log and by picking the access requests in the time zone corresponding to the amount of increase. Alternatively, it may also be possible to collect statistics information by giving in advance a predetermined number of samples and by picking the access requests until the number of samples is reached.

The no-update probability p may be given in advance by a user. For example, when it is not desired to limit the database update even if the recovery is prolonged, it may also be possible to set p to 0% in advance (all the updates are accepted at all times). Alternatively, in the case where the update is not taken into consideration, such as the case of the database dedicated to reference transactions, it may also be possible to set p to 100% in advance (all the updates are limited at all times regardless of the subsequent processing). It may also be possible to set p to a predetermined value in advance, such as 50%. When the value of p is given in advance, step S36 is skipped.

In the case where the processing at steps S34 to S37 takes a long time, it is also considered to perform steps S34 to S37 while the first time difference application is being performed in the database server 100a (there is a time margin until the first time difference application is completed). In this case, the notification of the start of the first time difference application at step S39 is received before step S38. Next, the procedure of the database update control at step S40 described above is explained.

Figure 14:
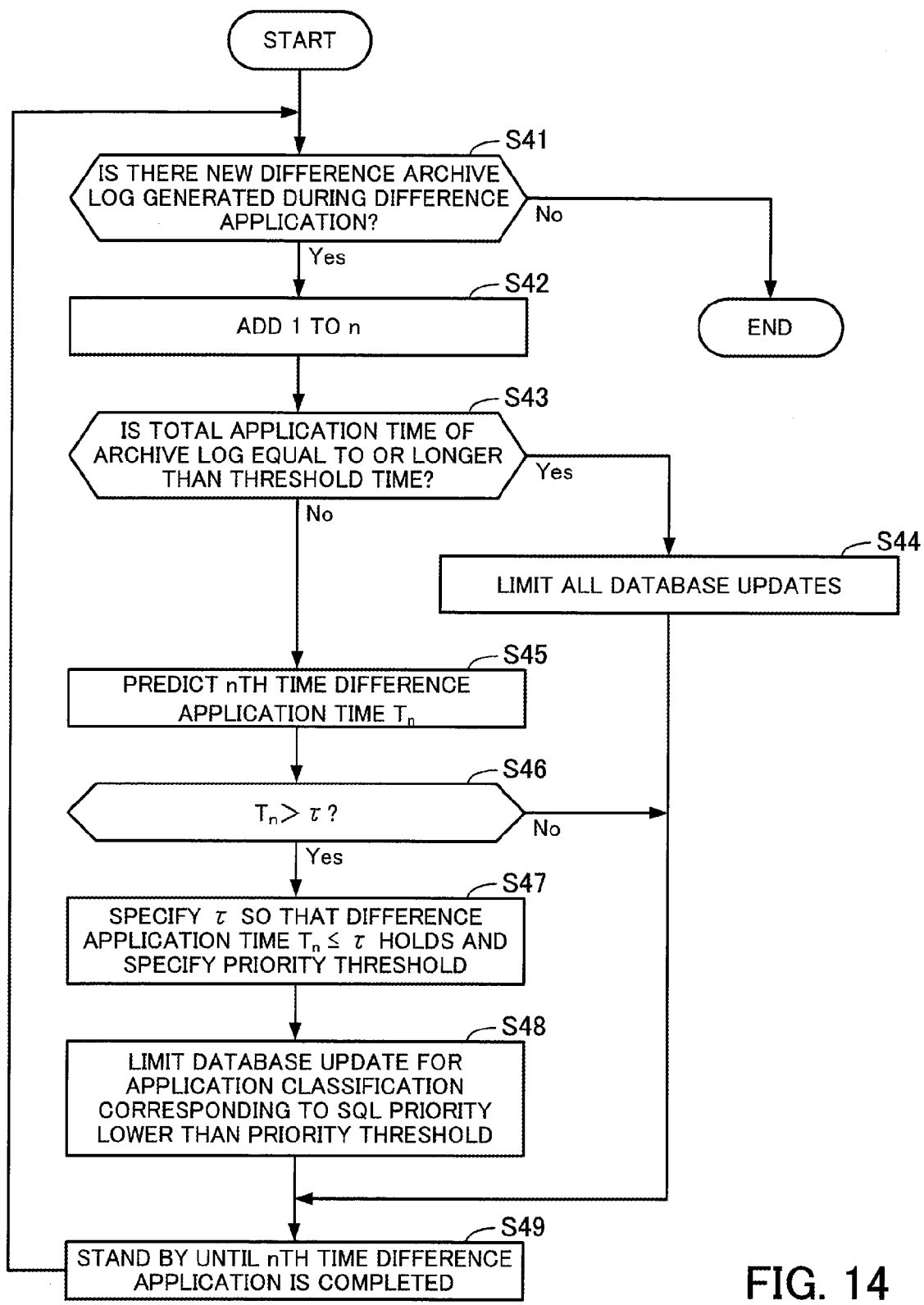
FIG. 14 is a flowchart illustrating an example of database update control of the main system.

FIG. 14 is a flowchart illustrating an example of the database update control of the main system. Hereinafter, the processing illustrated in FIG. 14 is explained in order of the step number.

(S41) The analyzer 143 determines whether or not there is a new difference archive log generated during the difference application. When there is a new difference archive log, the processing proceeds to step S42. When there is no new difference archive log, the processing is ended. The analyzer 143 may perform the determination by monitoring whether or not a new difference archive log is generated by the controller 141 during the difference application.

(S42) The analyzer 143 adds one to the variable n.

(S43) The analyzer 143 determines whether or not the total application time of the archive log (including the difference archive log) is equal to or longer than a threshold time. When the total application time of the archive log is equal to or longer than the threshold time, the processing proceeds to step S44. When the total application time of the archive log is shorter than the threshold time, the processing proceeds to step S45. The total application time of the archive log at the time point at step S43 is obtained by referring to the archive log application time whose measurement was started at step S33 in FIG. 13. The threshold time is stored in advance, for example, in the control information storage unit 130. For example, the threshold time is set to the time twice the time taken to apply the backup data. The time taken to apply the backup data is already acquired at step S31 in FIG. 13.

(S44) The analyzer 143 limits the update of the database 110 by all the applications (even if the update request is received, database 110 is not updated). Then, the processing proceeds to step S49.

(S45) The analyzer 143 predicts an nth time difference application time Tn. Specifically, the analyzer 143 predicts the difference application time Tn to be (the size of the difference archive log generated during the (n−1)th time difference application)/the difference application predicted rate Va.

(S46) The analyzer 143 determines whether or not the predicted difference application time Tn>the no-update expected time $\tau$ holds. When Tn>$\tau$ holds, the processing proceeds to step S47. When Tn≤$\tau$ holds, the processing proceeds to step S49.

(S47) The analyzer 143 refers to the no-update probability table 132 stored in the control information storage unit 130 and specifies a priority threshold with which a time $\tau'$ may be obtained, during which the no-update probability is p or higher and the difference application time Tn≤the no-update expected time $\tau=\tau'$ holds. Then, the analyzer 143 specifies the smallest priority threshold of the specified priority thresholds. The analyzer 143 sets the maximum time $\tau'$ during which the no-update probability is p or higher for the smallest priority threshold to $\tau$ again. For example, it is assumed that, as described previously, the no-update probability p=60%, the no-update expected time $\tau=\tau_0=2$ min, and the predicted difference application time Tn=4 min. In this case, according to the no-update probability table 132, the no-update expected time $\tau=\tau'$ is set to 5 min again and the priority threshold of "3" is specified. This means that it is recommended to limit the update of the database 110 by the applications belonging to the application classification whose SQL priority is lower than "3" in order to maintain the no-update probability p of 60% or higher for the predicted difference application time Tn.

(S48) The analyzer 143 instructs the controller 141 to limit the update of the database 110 by the applications belonging to the application classification whose SQL priority is lower than the priority threshold specified at step S47. From now on, the controller 141 limits the update of the database 110 by the specified applications. For example, when the specified priority threshold is "3", the database 110 is not updated even if the update requests are received from the application belonging to the application classification of "batch processing" whose SQL priority is "1" and from the application belonging to the application classification of "general processing" whose SQL priority is "2". In this case, the log corresponding to the update request will not be stored in the online log or in the difference archive log. From the opposite point of view, only the update of the database 110 by the application belonging to the application classification whose SQL priority is "3" or higher is accepted.

(S49) The analyzer 143 receives the notification of the start of the nth time difference application. The notification of the start of the difference application corresponds to the notification of the start of the nth time difference application at step S26 explained in FIG. 11. The analyzer 143 stands by until the nth time difference application is completed. The analyzer 143 detects that the nth time difference application is completed by receiving the notification of the completion of the nth time difference application from the database server 100a. Then, the processing proceeds to step S41.

In this manner, the database server 100 limits the update of the database 110 while the application of the difference archive log is being performed in the database server 100a. At this time, the database server 100 refers to the SQL priority table 131 indicating the SQL priority for each application classification and selects the application classification for which update is limited in the order from the lowest SQL priority so that the probability that the database 110a is not updated for the elapsed time equal to or longer than the predicted difference application time is equal to or higher than the no-update probability p.

A plurality of selection patterns of the application classifications for which the update is limited and the probability that the database 110a is not updated for the elapsed time when each selection pattern is adopted are given by the no-update probability table 132. It may also be said that the analyzer 143 specifies a selection pattern (priority threshold) with which the probability that the database 110a is not updated for the elapsed time equal to or longer than the predicted difference application time is equal to or higher than the no-update probability p from among the plurality of selection patterns.

As illustrated at step S44, when the total application time of the archive log is equal to or longer than the threshold time, it is possible to suppress the time taken for recovery from becoming too long by limiting all the updates of the database 110.

Figure 15:
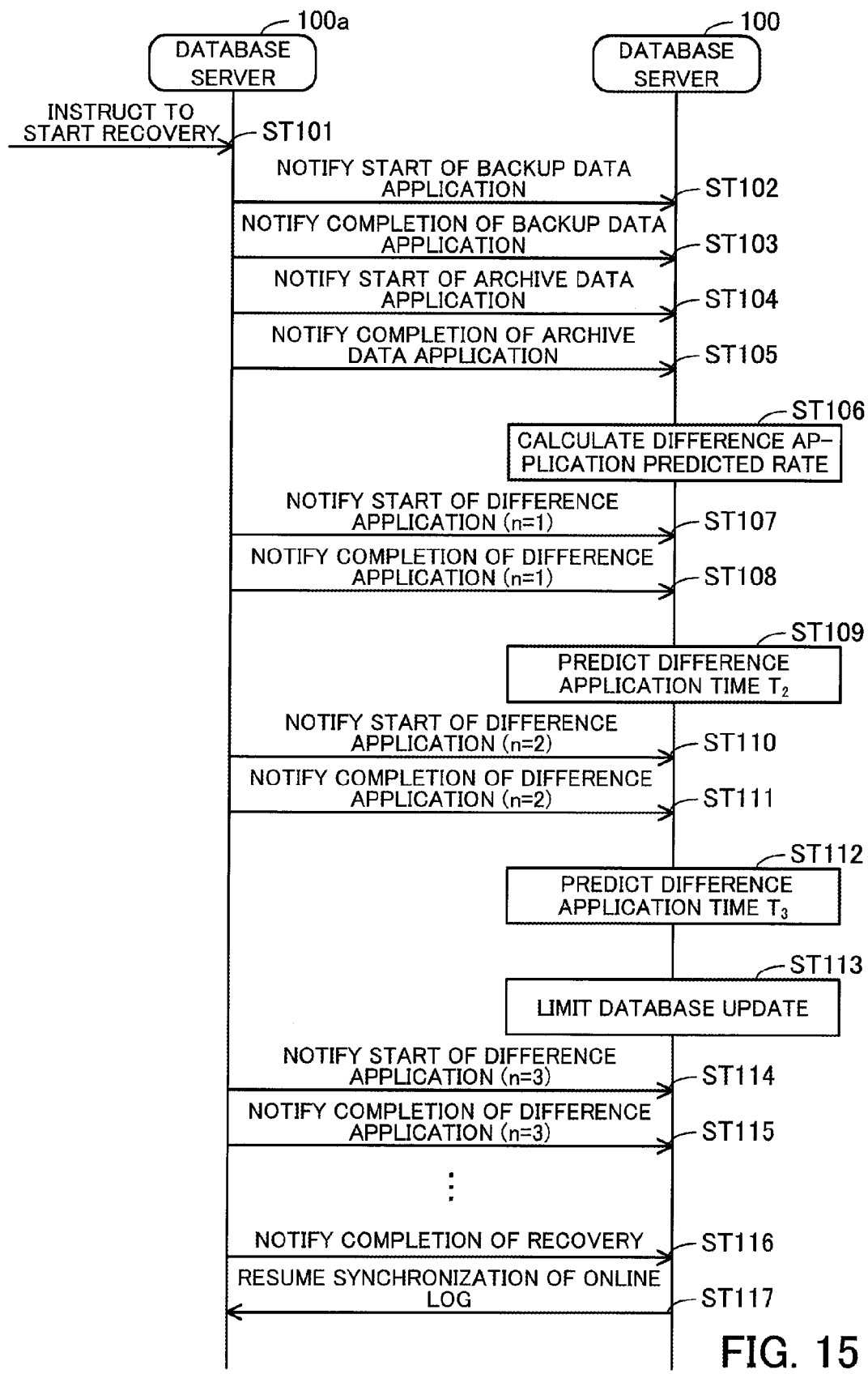
FIG. 15 is a sequence illustrating an example of processing at the time of recovery.

FIG. 15 is a sequence illustrating an example of the processing at the time of recovery. Hereinafter, the processing illustrated in FIG. 15 is explained in order of the step number. FIG. 15 illustrates the case where a difference archive log is generated during the application of the archive log. In FIG. 15, the symbols illustrated in FIG. 12 are used.

(ST101) The database server 100a receives an instruction to start recovery.

(ST102) The database server 100a notifies the database server 100 of the start of backup data application (transmission of notification of the start of backup data application). The database server 100 receives the notification. The database server 100 starts to acquire statistics information. The database server 100a reads backup data from the backup storage unit 210 and restores the database 110a. The database server 100 receives an update request also during the restoration and generates the online log and the archive log.

(ST103) The database server 100a completes the backup data application. The database server 100a notifies the database server 100 of the completion of the backup data application (transmission of notification of the completion of the backup data application). The database server 100 receives the notification.

(ST104) The database server 100a notifies the database server 100 of the start of archive log application (transmission of notification of the start of archive log application). The database server 100 receives the notification. The database server 100 starts measurement of the start time of archive log application. The database server 100a reads the archive log 222 from the archive log storage unit 220 and restores the database 110a. The database server 100 receives an update request also during the restoration. The database server 100 generates the online log in accordance with the update. Further, the database server 100 generates the difference archive log 223 based on the online log and stores the difference archive log 223 in the archive log storage unit 220.

(ST105) The database server 100a completes the application of the archive log 222. The database server 100a notifies the database server 100 of the completion of archive log application (transmission of notification of the completion of archive log application). The database server 100 receives the notification.

(ST106) The database server 100 calculates the difference application predicted rate Va based on the application state of the archive log 222. Further, the database server 100 also calculates the database update rate Vu. However, the database update rate Vu may be calculated with another timing (e.g., before step ST106). For example, the database server 100 calculates the no-update probability p from the completion desired time N using Expression (7) illustrated previously and specifies the no-update expected time $\tau=\tau_0$ (however, a value given in advance may be used as the no-update probability p as described previously).

(ST107) The database server 100a notifies the database server 100 of the start of the first time (n=1) difference application (transmission of notification of the start of difference application). The database server 100 receives the notification. The database server 100a reads the difference archive log 223 from the archive log storage unit 220 and restores the database 110a. The database server 100 receives update requests also during the restoration. The database server 100 generates the online log in accordance with the update. Further, the database server 100 generates the difference archive log 224 based on the online log and stores the difference archive log 224 in the archive log storage unit 220.

(ST108) The database server 100a notifies the database server 100 of the completion of the first time (n=1) difference application (transmission of notification of the completion of difference application). The database server 100 receives the notification.

(ST109) The database server 100 predicts a difference application time T2. The difference application time T2 is a predicted value of the time taken to apply the difference archive log 224. Here, it is assumed that the difference application time $T2 \le \tau=\tau_0$ holds. Because of this, the database server 100 does not limit the update of the database 110.

(ST110) The database server 100a notifies the database server 100 of the start of the second time (n=2) difference application (transmission of notification of the start of difference application). The database server 100 receives the notification. The database server 100a reads the difference archive log 224 from the archive log storage unit 220 and restores the database 110a. The database server 100 receives update requests also during the restoration. The database server 100 generates the online log in accordance with the update. Further, the database server 100 generates a new difference archive log (not illustrated in FIG. 12) based on the online log and stores the new difference archive log in the archive log storage unit 220. Here, a large amount of updates of the database 110 is generated unexpectedly at the time of application of the second time difference application. The amount of data written to the online log increases and the size of the difference archive log to be newly generated also increases.

(ST111) The database server 100a notifies the database server 100 of the completion of the second time (n=2) difference application (transmission of notification of the completion of difference application). The database server 100 receives the notification.

(ST112) The database server 100 predicts a difference application time T3. The difference application time T3 is a predicted value of the time taken to apply the new difference archive log generated during steps ST110 to ST111. Here, the database 110 is updated unexpectedly during the application of the second time difference application, and therefore, the difference application time T3 will be a comparatively long time. It is assumed that the difference application time $T3 > \tau=\tau_0$ holds. In this case the database server 100 refers to the no-update probability table 132 and specifies the lowest priority threshold that may provide the no-update probability equal to or higher than the no-update probability p and cause $T3 \le \tau=\tau'$ to hold (when there is a $\tau'$ in plurality, the maximum time is selected and substituted for $\tau$).

(ST113) The database server 100 limits the update of the database 110. For example, even when receiving update requests from part of a plurality of applications executed on the application server 300, the database server 100 does not perform update in accordance with the update requests. As described previously, it is possible for the database server 100 to specify a combination of applications for which the update is limited for each application classification based on the priority threshold.

(ST114) The database server 100a notifies the database server 100 of the start of the third time (n=3) difference application (transmission of notification of the start of difference application). The database server 100 receives the notification. The database server 100a reads a new difference archive log generated during steps ST110 to ST111 from the archive log storage unit 220 and restores the database server 100a. The database server 100 receives update requests also during the restoration, but limits the update by part of the applications.

(ST115) The database server 100a notifies the database server 100 of the completion of the third time (n=3) difference application (transmission of notification of the completion of difference application). The database server 100 receives the notification. After this, the database server 100 predicts the difference application time Tn of the next difference archive log as at step ST112 and extends the range of the application classification for which the update of the database 110 is limited in accordance with the result of comparison in magnitude between Tn and τ (the database server 100 increases the priority threshold).

(ST116) The database server 100a checks that a new difference archive log is not generated in the archive log storage unit 220 after the completion of the nth time difference application. The database server 100a notifies the database server 100 of the completion of recovery (transmission of notification of the completion of recovery). The database server 100 receives the notification. The database server 100 cancels the limitation of the update of the database 110.

(ST117) The database server 100 resumes the synchronization of the online log with the database server 100a by the log ship function.

Figure 16:
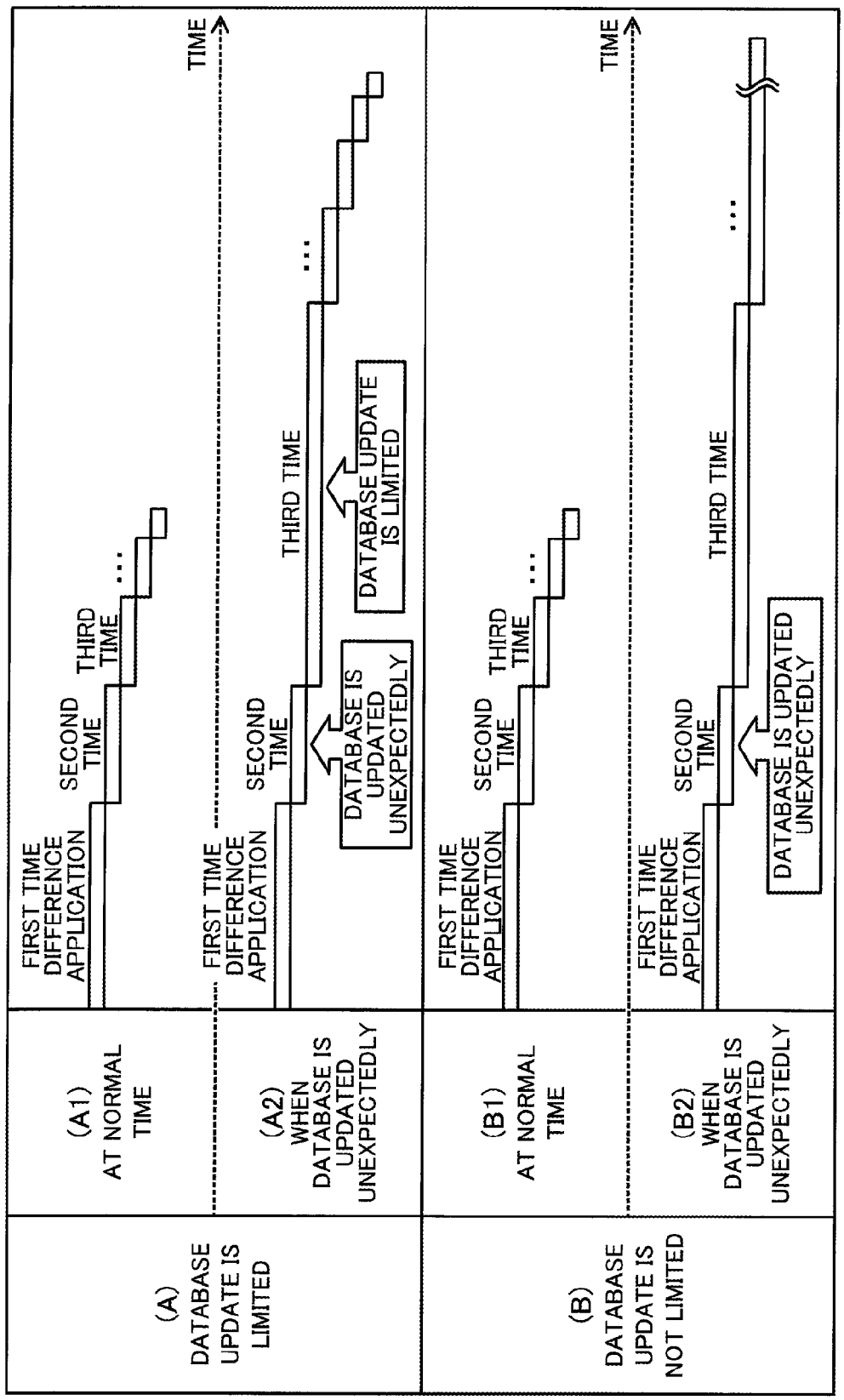
FIG. 16 illustrates an example of a time taken for difference application.

FIG. 16 illustrates an example of the time taken for difference application. FIG. 16(A) illustrates the time taken for difference application when the update of the database 110 is limited. FIG. 16(B) illustrates the time taken for difference application when the update of the database 110 is not limited as a comparison to FIG. 16(A).

In FIG. 16(A), the horizontal axis represents time and the times taken for difference application at the normal time (A1) (when the database is not updated unexpectedly during the difference application) and at the time when the database is updated unexpectedly (A2) (the case illustrated in FIG. 15) are illustrated.

In FIG. 16(A1), as the number of times of difference application increases, the time taken for difference application becomes shorter gradually and then the difference application is completed before a new difference archive log is generated and recovery is completed within a predetermined time.

FIG. 16(A2) illustrates the case where the database 110 is updated unexpectedly during the second time difference application. The update of the database 110 is limited during the third time difference application. Consequently, it is possible to suppress the size of a difference archive log generated during the third time difference application from becoming too large even if the third time difference application takes a comparatively long time. As a result of that, it is possible to complete the fourth time difference application within the no-update expected time T. In this manner, the update of the database 110 is limited so that each difference application is completed within the no-update expected time obtained by the no-update probability p. By limiting the update of the database 110, it is possible to complete the application of difference archive substantially within the completion desired time N.

In FIG. 16(B), the horizontal axis represents time and the times taken for difference application at the normal time (the database is not updated unexpectedly during the difference application (B1) and at the time when the database is updated unexpectedly (B2) are illustrated.

The case in FIG. 16(B1) is the same as that in FIG. 16(A1). In other words, as the number of times of difference application increases, the time taken for difference application becomes shorter gradually and then the difference application is completed before a new difference archive log is generated and recovery is completed within a predetermined time.

The case in FIG. 16(B2) illustrates the case where the database of the main system is updated unexpectedly during the second time difference application. FIG. 16(B2) differs from FIG. 16(A2) in that the update of the database of the main system is not limited during the third time difference application. Because the third time difference application takes a comparatively long time, the number of updates of the database of the main system during the third time difference application also increases, and therefore, the contents of the updates stored in the difference archive log also become too large. Consequently, the fourth time difference application also takes a comparatively long time, and therefore, the number of updates of the database of the main system during the fourth time difference application also increases and the contents of the updates stored in the difference archive log also become too large.

In FIG. 16(B2), if this state continues, the difference application is not completed even a long time elapses, and therefore, the possibility that it takes a time longer than the completion desired time N to complete recovery becomes strong. In the meantime, the information processing system is operated by the single database of the main system and the longer this state continues, the more serious becomes the influence on failure resistance. In contrast to this, it is desirable to quickly complete recovery of the database of the sub-system also and to resume the redundant operation.

Because of this, the database server 100 limits at least part of updates of the database 110 during the application of the difference archive log 224 when it is predicted that the application of the difference archive log 224 takes a comparatively long time. Consequently, it is possible to reduce the amount of updates stored in a new difference archive log and to reduce the time taken to apply the new difference archive log compared to the case where all the updates are stored. Because of this, it is also possible to reduce the amount of updates stored during the application of the new difference archive log and by repeating this processing, it is possible to suppress recovery from being prolonged.

It is expected to complete restoration using a difference archive log substantially within the completion desired time N and it is made possible to predict the approximate time taken to complete the restoration using the difference archive log.

It is also considered to suspend the operation using the database server 100 and not to update the database 110 while the database server 100a is performing recovery. However, in this case, it is no longer possible to perform user's transactions, and therefore, inconvenient. According to the information processing system of the second embodiment, it is possible to perform recovery while continuing transactions, and therefore, convenience is improved compared to the case where the update of the database 110 is completely suspended. In other words, it is possible to satisfy both improvement in convenience and suppression of prolongation of recovery in a well-balanced manner.

In the second embodiment, explanation is given by illustrating the databases 110 and 110*a* as the examples of data groups, but it is possible to apply the processing of the second embodiment to a data group other than the databases 110 and 110*a* as long as data is updated using a history of updates.

Further, as described previously, the information processing of the first embodiment may be implemented by causing the arithmetic operation unit 1*a* to execute programs. The information processing of the second embodiment may be implemented by causing the processor 101 to execute programs. The programs may be stored in a computer-readable storage medium (e.g., the optical disc 13, the memory device 14, the memory card 16, etc.).

For example, by distributing a storage medium storing the programs, it is possible to distribute the programs. Further, it may also be possible to store the programs in another computer and to distribute the programs via a network. It may also be possible for a computer to store (install) the programs stored in, for example, a storage medium, or the programs received from another computer in a storage device, such as the RAM 102 and the HDD 103, and to read the programs from the storage device and execute the programs.

In one aspect, it is possible to suppress data restoration from being prolonged.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein an update control program that causes a computer to perform a process, the computer being in a system which includes a first storage device and a second storage device, the process comprising:

receiving a request to update a first data group stored in the first storage device during restoration of a second data group stored in the second storage device using first history information indicating a history of updates of the first data group;

generating second history information indicating a history of updates based on the received request;

predicting an amount of time to complete the restoration using the second history information based on an amount of the second history information; and limiting, based on the predicted amount of time, at least part of updates of the first data group during the restoration using the second history information.

2. The computer-readable storage medium according to claim 1, wherein the limiting includes comparing the predicted amount of time with a threshold and selecting software for which the update is limited from a plurality of software making requests to update the first data group based on the predicted amount of time when the predicted amount of time is longer than the threshold.

3. The computer-readable storage medium according to claim 2, wherein the selecting includes selecting software for which the update is limited for each classification in order from the lowest priority so that a probability that the first data group is not updated for an elapsed time equal to or longer than the predicted amount of time is equal to or higher than a predetermined probability by referring to information indicating priorities in accordance with the classifications to which the plurality of software belong, respectively.

4. The computer-readable storage medium according to claim 3, wherein the selecting includes accepting a user's input specifying an amount of time that is spent on restoration of the second data group using a plurality of pieces of history information and calculating the predetermined probability based on the specified amount of time.

5. The computer-readable storage medium according to claim 3, wherein the process further includes, before the selecting, measuring the number of access requests to the first data group received according to the elapsed time and the number of update requests of the access requests for each of the classifications and calculating, based on the measurement result, a probability that the first data group is not updated with respect to the elapsed time for a plurality of selection patterns when selecting a classification for which the update is limited in order from the lowest priority, and wherein the selecting includes specifying, from among the plurality of selection patterns, a selection pattern with which a probability that the first data group is not updated with respect to the elapsed time equal to or longer than the predicted amount of time is equal to or higher than the predetermined probability.

6. An information processing system including a first storage device and a second storage device, the information processing system comprising:

an information processing apparatus configured to:
receive a request to update a first data group stored in the first storage device during restoration of a second data group stored in the second storage device using first history information indicating a history of updates of the first data group;

generate second history information indicating a history of updates based on the received request;

predict an amount of time to complete the restoration using the second history information based on an amount of the second history information; and limit, based on the predicted amount of time, at least part of updates of the first data group during the restoration using the second history information.

7. A data update control method of a system which includes a first storage device, a second storage device, and an information processing apparatus, the method comprising:

receiving, by a processor of the information processing apparatus, a request to update a first data group stored in the first storage device during restoration of a second data group stored in the second storage device using first history information indicating a history of updates of the first data group;

generating, by the processor, second history information indicating a history of updates based on the received request;

predicting, by the processor, an amount of time to complete the restoration using the second history information based on an amount of the second history information; and limiting, by the processor, based on the predicted amount of time, at least part of updates of the first data group during the restoration using the second history information.

* * * * *